US012719055B2

(12) United States Patent
Koga et al.

(10) Patent No.: US 12,719,055 B2
(45) Date of Patent: Aug. 25, 2026

(54) BATTERY

(71) Applicant: PANASONIC INTELLECTUAL PROPERTY MANAGEMENT CO., LTD., Osaka (JP)

(72) Inventors: Eiichi Koga, Hokkaido (JP); Kazuhiro Morioka, Osaka (JP); Yasutaka Tsutsui, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 427 days.

(21) Appl. No.: 18/392,953

(22) Filed: Dec. 21, 2023

(65) Prior Publication Data

US 2024/0128450 A1 Apr. 18, 2024

Related U.S. Application Data

(63) Continuation of application No. 17/970,166, filed on Oct. 20, 2022, now Pat. No. 11,888,158, which is a (Continued)

(30) Foreign Application Priority Data

Jul. 25, 2017 (JP) ................................ 2017-143358

(51) Int. Cl.
*H01M 4/70* (2006.01)
*H01M 4/525* (2010.01)
(Continued)

(52) U.S. Cl.
CPC ............ *H01M 4/525* (2013.01); *H01M 4/70* (2013.01); *H01M 10/052* (2013.01); (Continued)

(58) Field of Classification Search
CPC ...... H01M 4/525; H01M 4/70; H01M 10/052; H01M 10/0562; H01M 10/0585; (Continued)

(56) References Cited

U.S. PATENT DOCUMENTS 5,085,948 A 2/1992 Tsukamoto et al.
10,727,490 B2 7/2020 Sasaki
(Continued)

FOREIGN PATENT DOCUMENTS

JP 2008-078109 4/2008
JP 2008-117630 5/2008
(Continued)

OTHER PUBLICATIONS

Extended European Search Report (EESR) from European Patent Office (EPO) in European Patent Appl. No. 22159772.7, dated Jun. 28, 2022.

*Primary Examiner* — Christian Roldan
(74) *Attorney, Agent, or Firm* — Greenblum & Bernstein, P.L.C.

(57) ABSTRACT

A battery includes: an electrode layer; a counter electrode layer, which is a counter electrode for the electrode layer; a solid electrolyte layer between the electrode layer and the counter electrode layer; and an electrode current collector electrically coupled to the electrode layer. The solid electrolyte layer includes a first region containing a first solid electrolyte material and a second region containing a second solid electrolyte material. The first region is positioned within a region where the electrode layer and the counter electrode layer face each other. Moreover, a second density, which is of the second solid electrolyte material in the second region, is higher than a first density, which is of the first solid electrolyte material in the first region.

19 Claims, 30 Drawing Sheets

Related U.S. Application Data continuation of application No. 16/034,324, filed on Jul. 12, 2018, now Pat. No. 11,509,027.

(51) Int. Cl.
*H01M 10/052* (2010.01)
*H01M 10/0562* (2010.01)
*H01M 10/0585* (2010.01)
*H01M 10/617* (2014.01)
*H01M 10/653* (2014.01)
*H01M 10/654* (2014.01)
*H01M 50/54* (2021.01)
*H01M 50/557* (2021.01)

(52) U.S. Cl.
CPC ... *H01M 10/0562* (2013.01); *H01M 10/0585* (2013.01); *H01M 10/617* (2015.04); *H01M 10/653* (2015.04); *H01M 10/654* (2015.04); *H01M 50/54* (2021.01); *H01M 50/557* (2021.01)

(58) Field of Classification Search
CPC ............. H01M 10/617; H01M 10/653; H01M 10/654; H01M 50/54; H01M 50/557; H01M 10/647; H01M 10/652; H01M 10/0525; H01M 10/613; Y02E 60/10; Y02P 70/50
See application file for complete search history.

(56) References Cited

U.S. PATENT DOCUMENTS

2004/0033403 A1* 2/2004 Mardilovich ........... H01M 8/02 429/479
2008/0274411 A1 11/2008 Nakajima et al.
2009/0087751 A1 4/2009 Kondo et al.
2009/0191461 A1 7/2009 Nakamura
2009/0269665 A1* 10/2009 Nakamura .......... H01M 10/056 429/209
2009/0280399 A1 11/2009 Nakamura
2013/0323603 A1 12/2013 Ryu et al.
2014/0116761 A1* 5/2014 Lee ........................ H01G 4/232 174/258
2017/0309965 A1 10/2017 Honda
2018/0198169 A1 7/2018 Fukui et al.
2018/0337422 A1 11/2018 Iwamoto

FOREIGN PATENT DOCUMENTS

JP 2009-064645 3/2009
JP 2016-192265 11/2016
JP 2017-010786 1/2017
JP 2017-073374 4/2017
WO 2008/053830 5/2008

* cited by examiner

BATTERY

CROSS REFERENCE TO RELATED APPLICATIONS

This is a continuation of U.S. patent application Ser. No. 17/970,166, filed Oct. 20, 2022, which is a continuation of U.S. patent application Ser. No. 16/034,324, filed Jul. 12, 2018 (and now U.S. Pat. No. 11,509,027, issued Nov. 22, 2022), which claims the benefit of Japanese Pat. Appl. No. 2017-143358, filed Jul. 25, 2017. The disclosure of each of the above-identified documents, including the specification, drawings, and claims, is incorporated herein by reference in its entirety.

BACKGROUND

1. Technical Field

The present disclosure relates to a battery.

2. Description of the Related Art

Japanese Patent No. 4274256 discloses a power storage apparatus in which the density of a solid electrolyte in an electrode layer containing an active material differs depending on the position in the electrode layer.

Japanese Unexamined Patent Application Publication No. 2016-192265 discloses an all-solid secondary battery equipped with a solid electrolyte layer.

SUMMARY

One non-limiting and exemplary embodiment provides a battery having an excellent heat dissipating property.

In one general aspect, the techniques disclosed here feature a battery that includes an electrode layer, a counter electrode layer, which is a counter electrode for the electrode layer, and a solid electrolyte layer between the electrode layer and the counter electrode layer. The solid electrolyte layer has a first region containing a first solid electrolyte material and a second region containing a second solid electrolyte material. The first region is positioned within a region where the electrode layer and the counter electrode layer face each other. With respect to the first region, the second region is positioned on an outer peripheral side of the region where the electrode layer and the counter electrode layer face each other, and the second region is in contact with the first region. A second density is higher than a first density, where the first density is a density of the first solid electrolyte material in the first region and the second density is a density of the second solid electrolyte material in the second region.

According to this disclosure, a battery with an excellent heat dissipating property is obtained.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments are described below with reference to the drawings.

All of the embodiments described below are merely exemplary specific examples. The numbers, shapes, materials, constituent elements, positions where the constituent elements are arranged, form of connection, etc., described in the embodiments below are merely exemplary and are not meant to limit the present disclosure. Moreover, among the constituent elements in the embodiments described below, those that are not described in the independent claims indicating the broadest concepts are described as optional constituent elements.

First Embodiment

Figure 1:
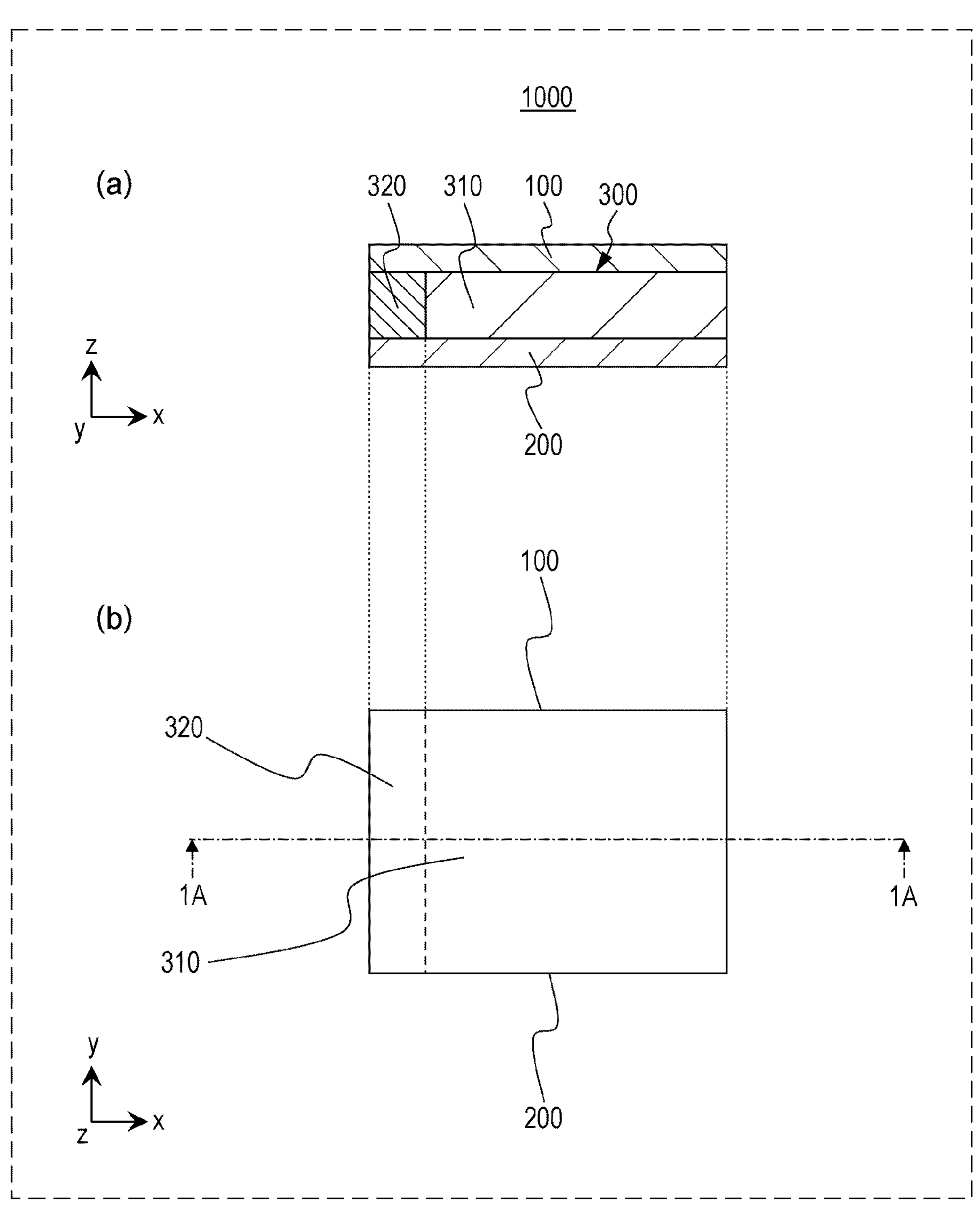
FIG. 1 illustrates a schematic structure of a battery according to the first embodiment.

FIG. 1 illustrates a schematic structure of a battery 1000 according to the first embodiment.

FIG. 1(*a*) is an x-z diagram (1A cross-sectional view) illustrating the schematic structure of the battery 1000 according to the first embodiment.

FIG. 1(*b*) is an x-y diagram (top perspective view) illustrating the schematic structure of the battery 1000 according to the first embodiment.

The battery 1000 of the first embodiment includes an electrode layer 100, a counter electrode layer 200, and a solid electrolyte layer 300.

The counter electrode layer 200 is a layer that serves as the counter electrode for the electrode layer 100.

The solid electrolyte layer 300 is positioned between the electrode layer 100 and the counter electrode layer 200.

The solid electrolyte layer 300 has a first region 310 and a second region 320.

The first region 310 is a region that contains a first solid electrolyte material.

The first region 310 is positioned within the region where the electrode layer 100 and the counter electrode layer 200 face each other.

The second region 320 is a region that contains a second solid electrolyte material.

With respect to the first region 310, the second region 320 is positioned on the outer peripheral side of the region where the electrode layer 100 and the counter electrode layer 200 face each other. The second region 320 is in contact with the first region 310.

The second density is higher than the first density.

Here, the first density is the density of the first solid electrolyte material in the first region 310.

The second density is the density of the second solid electrolyte material in the second region 320.

According to this structure, a battery with an excellent heat dissipating property, excellent strength, and excellent environmental resistance can be obtained.

In other words, according to this structure, the density of the solid electrolyte material in the outer rim portion of the solid electrolyte layer 300 can be increased. As a result, the thermal conductivity of the outer rim portion (in other words, the second region 320) of the solid electrolyte layer 300 can be adjusted to be higher than the thermal conductivity of the center portion (in other words, the first region 310) of the solid electrolyte layer 300. Thus, the heat from the center portion of the solid electrolyte layer 300, which is the portion likely to bear a high temperature during operation of the battery, is easily transferred (dissipated) to the outer rim portion of the solid electrolyte layer 300. Furthermore, since the first region 310 and the second region 320 are both regions that contain solid electrolyte materials (in other words, metal ion-conducting materials), matching and adhesion at the interface where the first region 310 and the second region 320 contact each other can be improved. That is to say, through the bonded interface between the first region 310 and the second region 320, metal ions are conducted by the solid electrolyte materials and, a the same time, the exothermic components are passed on so as to enable heat transfer from the first region 310 to the second region 320. Due to these phenomena, the heat generated in the center portion of the battery (for example, heat generated in the first region 310, the electrode layer 100, or the counter electrode layer 200) can be more easily dissipated to the surface of the solid electrolyte layer 300 (and the outside of the battery) through the outer rim portion (in other words, the second region 320) of the solid electrolyte layer 300 where the solid electrolyte material density is high (in other words, the thermal conductivity is high). As a result, the non-uniformity in temperature (temperature variation) in the solid electrolyte layer 300 containing the solid electrolyte material (for example, an inorganic solid electrolyte), which has no flowability, can be reduced. Thus, for example, even when the battery has a large area, the homogeneousness of the temperature inside the battery can be maintained. Thus, variation in properties inside the battery depending on the position caused by the temperature variation can be suppressed. As a result, deterioration of the battery performance can be suppressed. Thus, for example, the service life of the battery can be extended.

According to the above-described structure, since the solid electrolyte layer 300 positioned between the electrode layer 100 and the counter electrode layer 200 has the heat-dissipating function described above, heat generated from both the electrode layer 100 and the counter electrode layer 200 can be transferred to the outer rim portion of the battery through one battery component, which is the solid electrolyte layer 300. Furthermore, since the solid electrolyte layer 300 is positioned in the center portion (that is, the portion between the electrode layer 100 and the counter electrode layer 200) inside the battery, heat generated in the center portion of the battery can be more easily transferred to the outer rim portion of the battery compared to the structure in which a heat-dissipating member is installed on the electrode layer 100 (or counter electrode layer 200) side only.

According to the above-described structure, the strength of the second region 320 can be increased by increasing the solid electrolyte material density in the second region 320. In this manner, at least part of the outer rim of the first region 310 can be covered with the second region 320 having a higher strength. Thus, breaking of the first region 310 having a relatively low strength (for example, collapse of the first solid electrolyte material) can be suppressed by the second region 320. Thus, the strength of the battery can be improved.

According to the above-described structure, the second region 320 having a higher solid electrolyte material density can be interposed between the first region 310 and the outside of the battery (for example, outside air). As a result, for example, the outside air (for example, atmospheric air, humid air, or the like) coming into the first region 310 can be blocked by the second region 320. Thus, the environmental resistance of the battery can be improved.

The electrode layer 100 may contain an electrode active material.

The counter electrode layer 200 may contain a counter electrode active material.

Here, the density of the electrode active material in the first region 310 (for example, when the electrode active material is granular, the packing density of the particles of the electrode active material) and the density of the counter electrode active material (for example, when the counter electrode active material is granular, the packing density of the particles of the counter electrode active material) may both be lower than the first density.

The density of the electrode active material and the density of the counter electrode active material in the second region 320 may both be lower than the second density.

According to the above-described structure, the first region 310 and the second region 320 can be placed in a portion where the densities of the electrode active material and the counter electrode active material are low (in other words, the portion that is remote from both the electrode layer 100 and the counter electrode layer 200 and that lies in a portion closer to the center in the solid electrolyte layer 300). That is, the first region 310 and the second region 320 having high heat dissipating properties can be placed in a portion closer to the center inside the battery. As a result, heat generated in the center portion of the battery can be more easily transferred to the outer rim portion of the battery compared to the structure in which a heat-dissipating member is installed only in a portion closer to the electrode layer 100 (a portion closer to the counter electrode layer 200).

The first region 310 and the second region 320 may each be a region not containing an electrode active material or a counter electrode active material.

According to the above-described structure, the first region 310 and the second region 320 can be placed in a portion where the electrode active material and the counter electrode active material are not contained (in other words, the portion that is remote from both the electrode layer 100 and the counter electrode layer 200 and that lies in a portion closer to the center in the solid electrolyte layer 300). That is, the first region 310 and the second region 320 having high heat dissipating properties can be placed in a portion closer to the center inside the battery. As a result, heat generated in the center portion of the battery can be more easily transferred to the outer rim portion of the battery compared to the structure in which a heat-dissipating member is installed only in a portion closer to the electrode layer 100 (a portion closer to the counter electrode layer 200).

The range in which the electrode layer 100 is formed may have the same size as or a different size from the range in which the counter electrode layer 200 is formed. In other words, the electrode layer 100 and the counter electrode layer 200 may have the same shape or different shapes.

The electrode layer 100 may be a positive electrode layer. In this case, the electrode active material is a positive electrode active material. The counter electrode layer 200 is a negative electrode layer. The counter electrode active material is a negative electrode active material.

Alternatively, the electrode layer 100 may be a negative electrode layer. In this case, the electrode active material is a negative electrode active material. The counter electrode layer 200 is a positive electrode layer. The counter electrode active material is a positive electrode active material.

The positive electrode layer may be a layer mainly composed of a positive electrode material (for example, a positive electrode active material). Examples of the positive electrode active material contained in the positive electrode layer include various materials that can intercalate and deintercalate metal ions (for example, Li ions and Mg ions). Known positive electrode active materials can be used as the material for the positive electrode active material. Examples of the positive electrode active material that can be used include layer oxides such as lithium-nickel complex oxides ($LiNi_xM_{1-x}O_2$ (where M represents at least one element selected from Co, Al, Mn, V, Cr, Mg, Ca, Ti, Zr, Nb, Mo, and W, and x is any desired natural number)), lithium cobaltate ($LiCoO_2$), lithium nickelate ($LiNiO_2$), and lithium manganate ($LiMn_2O_4$); and transition metal oxides that contain lithium ions, such as lithium iron phosphate having an olivine structure ($LiFePO_4$) and lithium manganate having a spinel structure ($LiMn_2O_4$, $Li_2MnO_3$, and $LiMO_2$). In addition, sulfur (S) and sulfides such as lithium sulfide ($Li_2S$) can be used. Positive electrode active material particles coated with (or doped with) lithium niobate ($LiNbO_3$) or the like can also be used as the positive electrode active material.

The positive electrode layer may be a mixture layer composed of a positive electrode active material and other additive materials. Examples of the additive materials for the positive electrode layer include solid electrolytes (for example, an inorganic solid electrolyte), conductive aids (for example, acetylene black), and bonding binders (for example, polyethylene oxide and polyvinylidene fluoride). Mixing a particular percentage of a solid electrolyte to a positive electrode layer can improve the ion conductivity of the positive electrode layer.

The thickness of the positive electrode layer may be, for example, 5 to 300 μm.

The negative electrode layer may be a layer mainly composed of a negative electrode material (for example, a negative electrode active material). Examples of the negative electrode active material contained in the negative electrode layer include various materials that can intercalate and deintercalate metal ions (for example, Li ions and Mg ions). Known negative electrode active materials can be used as the material for the negative electrode active material. Examples of the negative electrode active material that can be used include carbon materials (for example, natural graphite, artificial graphite, graphite carbon fibers, and resin baked carbon), and alloy-based material that can be combined with solid electrolytes. Examples of the alloy-based materials that can be used include lithium alloys (LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$), lithium titanate ($Li_4Ti_5O_{12}$), aid oxides of metals (Zn etc.).

The negative electrode layer may be a mixture layer composed of a negative electrode active material and other additive materials. Examples of the additive materials for the negative electrode layer include solid electrolytes (for example, an inorganic solid electrolyte), conductive aids (for example, acetylene black), and bonding binders (for example, polyethylene oxide and polyvinylidene fluoride). Mixing a particular percentage of a solid electrolyte to a negative electrode layer can improve the ion conductivity of the negative electrode layer.

The thickness of the negative electrode layer is, for example, 5 to 300 μm.

Commonly known solid electrolytes for batteries (such as solid electrolytes that conduct metal ions (for example, Li ions, Mg ions, etc.)) can be used as the first solid electrolyte material and the second solid electrolyte material. Commonly known solid electrolytes (for example, inorganic solid electrolytes) can be used as the solid electrolyte. Examples of the inorganic solid electrolytes that can be used include sulfide solid electrolytes and oxide solid electrolytes. Examples of the solid electrolytes that can be used include lithium-containing sulfides (for example, those based on $Li_2S$—P2S5, $Li_2S$—$SiS_2$, $U_2S$—$B_2S_3$, $U_2S$—$GeS_2$, $Li_2S$—$SiS_2$—LiI, $Li_2S$—$SiS_2$—$Li_3PO_4$, $Li_2S$—$Ge_2S_2$, $Li_2S$—$GeS_2$—$P_2S_5$, and $L_2S$—$GeS_2$—ZnS). Other examples of the solid electrolytes that can be used include lithium-containing metal oxides (for example, $Li_2$—$SiO_2$ and $Li_2$—$SiO_2$—$P_2O_5$), lithium-containing metal nitrides (for example $Li_xP_yO_{1-z}N_2$ (where x, y, and z each represent any desired natural number)), lithium phosphate ($Li_3PO_4$), and lithium-containing transition metal oxides (for example, lithium titanium oxide). These materials may be used alone or in combination as the solid electrolyte.

The solid electrolyte layer 300 (for example, at least one (for example, all) of the first region 310, the second region 320, and a third region 330) can contain, in addition to the solid electrolyte material, a bonding binder (for example, polyethylene oxide or polyethylene oxide).

The thickness of the solid electrolyte layer 300 may be, for example, 5 to 150 μm.

The first solid electrolyte material and the second solid electrolyte material may be materials different from each other. In this manner, for example, while a solid electrolyte material having a high heat dissipating property is used as the second solid electrolyte material, a solid electrolyte material having high metal ion conductivity can be used as the first solid electrolyte material.

Alternatively, the first solid electrolyte material and the second solid electrolyte material may the same material.

According to the above-described structure, the same solid electrolyte material can be contained in the first region 310 and the second region 320. As a result, the physical property values (for example, a thermal expansion coefficient) of the first region 310 and the second region 320 can be adjusted to be close to each other. Thus, the matching and adhesion at the interface where the first region 310 and the second region 320 contact each other can be further improved. In other words, occurrence of structural defects that inhibit heat transfer between the first region 310 and the second region 320 can be further suppressed. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery) through the second region 320. Furthermore, for example, when the first region 310 and the second region 320 are composed of the same material, the battery production process (for example, mixing of the mixture and application of the mixture, etc.) can be further simplified.

The first solid electrolyte material may be constituted by particles. In such a case, the first region 310 is a region that contains particles of the first solid electrolyte material. Here, the first density is the density of the particles of the first solid electrolyte material in the first region 310 (in other words, the packing density).

The second solid electrolyte material may be constituted by particles. In such a case, the second region 320 is a region that contains particles of the second solid electrolyte material. Here, the second density is the density of the particles of the second solid electrolyte material in the second region 320 (in other words, the packing density).

The first region 310 may be a region in contact with at least one of the electrode layer 100 and the counter electrode layer 200. For example, as illustrated in FIG. 1, the first region 310 may be a region in contact with both of the electrode layer 100 and the counter electrode layer 200.

As illustrated in FIG. 1, the second region 320 may be positioned only within the region where the electrode layer 100 and the counter electrode layer 200 face each other.

Figure 2:
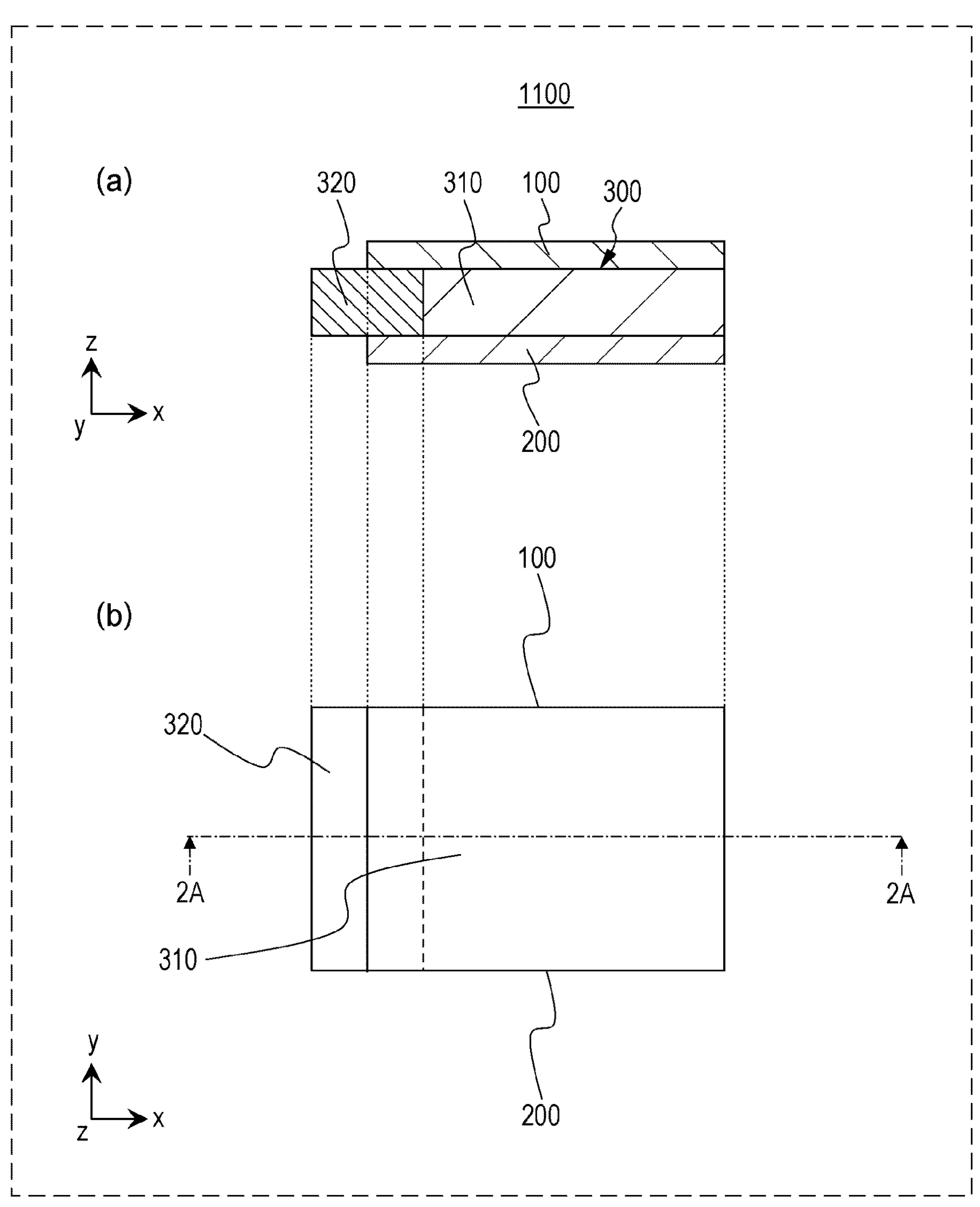
FIG. 2 illustrates a schematic structure of a battery according to the first embodiment.

FIG. 2 illustrates a schematic structure of a battery 1100 according to the first embodiment.

FIG. 2(*a*) is an x-z diagram (2A cross-sectional view) illustrating the schematic structure of the battery 1100 according to the first embodiment.

FIG. 2(*b*) is an x-y diagram (top perspective view) illustrating the schematic structure of the battery 1100 according to the first embodiment.

As illustrated in FIG. 2, the second region 320 may be positioned within the region where the electrode layer 100 and the counter electrode layer 200 face each other and also outside the region where the electrode layer 100 and the counter electrode layer 200 face each other. In this manner, the second region 320 can be placed to be more remote from the center portion of the battery. Thus, the heat dissipating property by the second region 320 can be further enhanced.

The second region 320 may be a region in contact with at least one of the electrode layer 100 and the counter electrode layer 200. For example, as illustrated in FIG. 1 or 2, the second region 320 may be a region in contact with both of the electrode layer 100 and the counter electrode layer 200.

Figure 3:
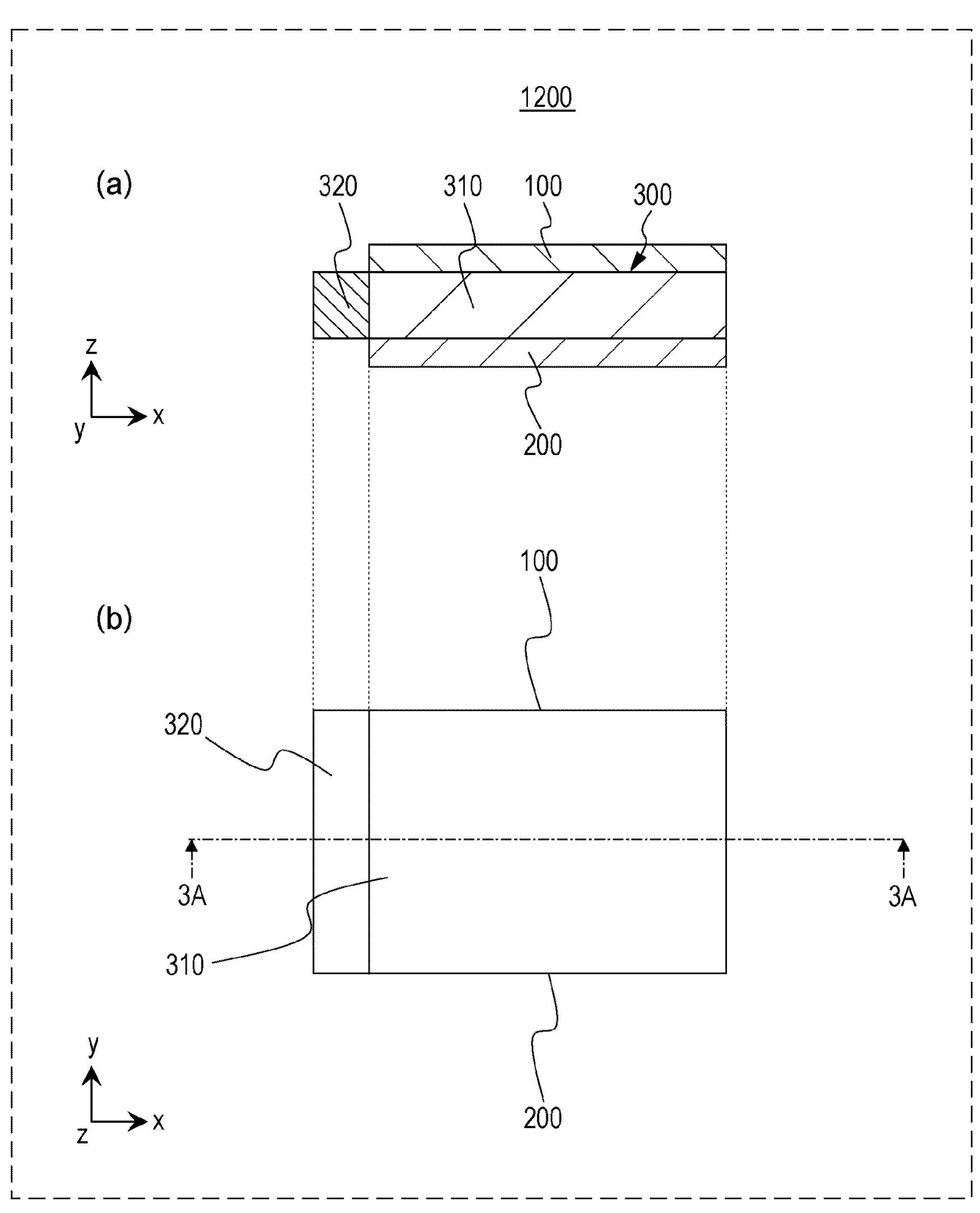
FIG. 3 illustrates a schematic structure of a battery according to the first embodiment.

FIG. 3 illustrates a schematic structure of a battery 1200 according to the first embodiment.

FIG. 3(*a*) is an x-z diagram (3A cross-sectional view) illustrating the schematic structure of the battery 1200 according to the first embodiment.

FIG. 3(*b*) is an x-y diagram (top perspective view) illustrating the schematic structure of the battery 1200 according to the first embodiment.

As illustrated in FIG. 3, the second region 320 may be positioned only outside the region where the electrode layer 100 and the counter electrode layer 200 face each other. In this manner, the second region 320 can be placed to be more remote from the center portion of the battery. Thus, the heat dissipating property by the second region 320 can be further enhanced. Furthermore, the area of the first region 310 positioned within the region where the electrode layer 100 and the counter electrode layer 200 face each other can be further increased. In other words, the area of the first region 310, which has a function of transferring metal ions, between the electrode layer 100 and the counter electrode layer 200 can be further increased.

As described above, in the present disclosure, "with respect to the first region 310, the second region 320 is positioned on the outer peripheral side of the region where the electrode layer 100 and the counter electrode layer 200 face each other" encompasses the structures (in other words, the arrangement of the second region 320) illustrated in FIGS. 1 to 3.

In the present disclosure, "the region where the electrode layer 100 and the counter electrode layer 200 face each other" encompasses, for example, "when viewed in a stacking direction of the electrode layer 100 and the counter electrode layer 200 (in other words, in the z direction in the drawing), a region where a part of a main surface (or the entire main surface) of the electrode layer 100 overlaps a part of a main surface (or the entire main surface) of the counter electrode layer 200 (in other words, the overlapping region)".

In the present disclosure, "the structure in which the electrode layer 100 and the counter electrode layer 200 face each other" encompasses, for example, "a structure in which another member (for example, the solid electrolyte layer 300) is disposed between the main surface of the electrode layer 100 and the main surface of the counter electrode layer 200 that face each other.

As illustrated in FIGS. 1 to 3, the second region 320 may be positioned only at one end portion of the solid electrolyte layer 300. For example, when the solid electrolyte layer 300 has a rectangular shape (for example, a quadrilateral shape) as illustrated in FIGS. 1 to 3, the second region 320 may be disposed at only one side of this shape.

Alternatively, the second region 320 may be positioned at two or more end portions among the end portions of the solid electrolyte layer 300. For example, when the solid electrolyte layer 300 has a rectangular shape (for example, a quadrilateral shape) as illustrated in FIGS. 1 to 3, the second region 320 may be disposed at two or more sides of this shape. In this manner, the heat dissipating property (and strength, environmental resistance, etc.) can be enhanced at the two or more end portions.

Second Embodiment

The second embodiment will now be described. Descriptions for the features overlapping those of the first embodiment are omitted as appropriate.

Figure 4:
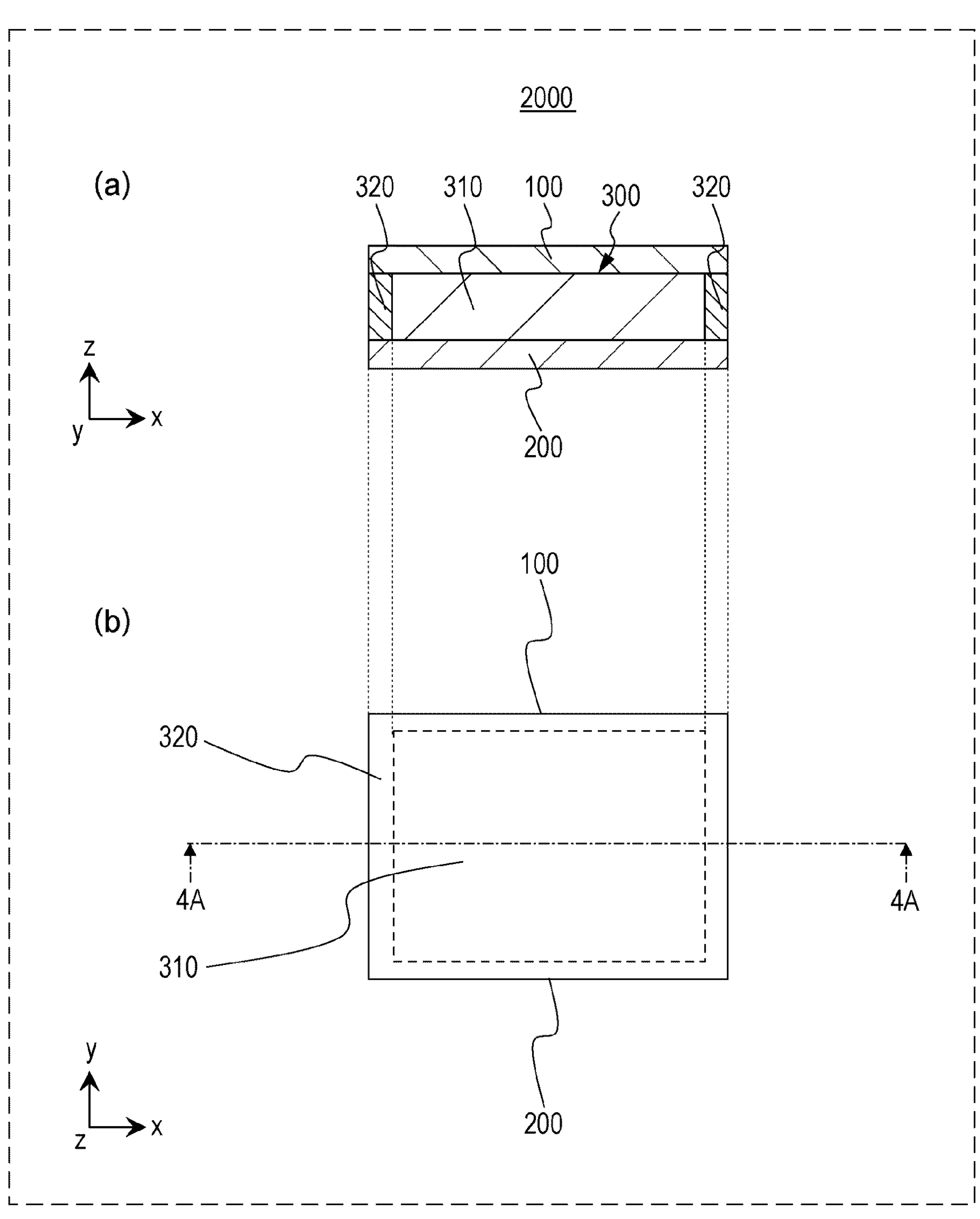
FIG. 4 illustrates a schematic structure of a battery according to a second embodiment.

FIG. 4 illustrates a schematic structure of a battery 2000 according to the second embodiment.

FIG. 4(*a*) is an x-z diagram (4A cross-sectional view) illustrating the schematic structure of the battery 2000 according to the second embodiment.

FIG. 4(*b*) is an x-y diagram (top perspective view) illustrating the schematic structure of the battery 2000 according to the second embodiment.

The battery 2000 according to the second embodiment further includes the following features in addition to the features of the battery 1000 of the first embodiment described above.

That is, in the battery 2000 of the second embodiment, the second region 320 surrounds the first region 310.

According to this structure, the density of the solid electrolyte material in the outer rim portion (for example, the entire outer rim portion) on the four sides of the solid electrolyte layer 300 can be increased. In this manner, the heat from the center portion of the solid electrolyte layer 300 is easily transferred (dissipated) to the outer rim portion of the solid electrolyte layer 300 close to the parts where heat has been generated. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

According to the above-described structure, the outer rim on the four sides (for example, the entire outer rim) of the first region 310 can be covered with the second region 320 having a higher strength. Thus, breaking of the outer rim on the four sides of the first region 310 having a relatively low strength (for example, collapse of the first solid electrolyte material) can be suppressed by the second region 320. Thus, the strength of the battery can be further improved.

According to the above-described structure, the second region 320 having a higher solid electrolyte material density can be interposed between the outer rim on the four sides of the first region 310 and the outside of the battery (for example, outside air). As a result, for example, the outside air (for example, atmospheric air, humid air, or the like) coming into the outer rim on the four sides of the first region 310 can be blocked by the second region 320. Thus, the environmental resistance of the battery can be further improved.

As illustrated in FIG. 4, the second region 320 may be positioned only within the region where the electrode layer 100 and the counter electrode layer 200 face each other.

Figure 5:
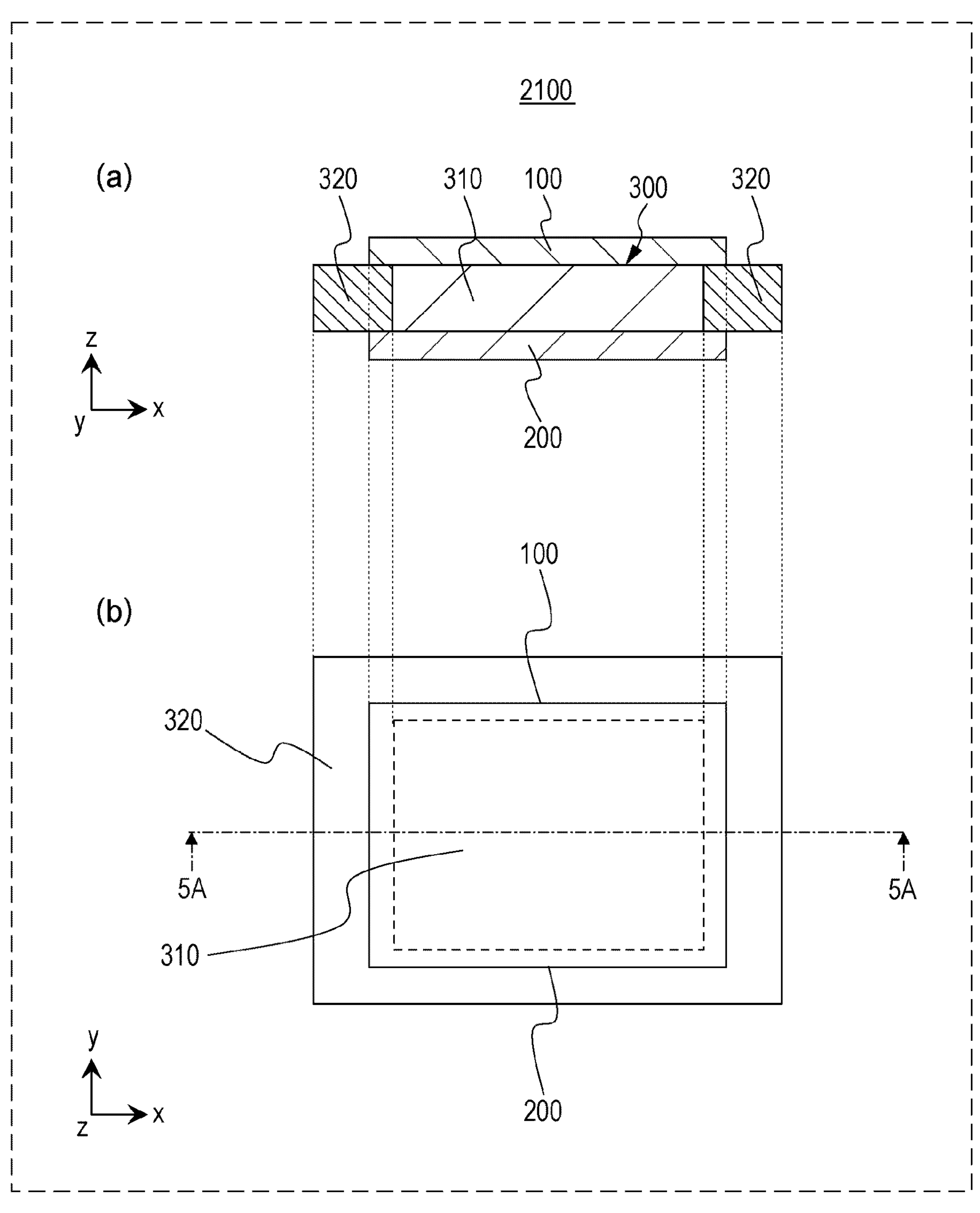
FIG. 5 illustrates a schematic structure of a battery according to the second embodiment.

FIG. 5 illustrates a schematic structure of a battery 2100 according to the second embodiment.

FIG. 5(*a*) is an x-z diagram (5A cross-sectional view) illustrating the schematic structure of the battery 2100 according to the second embodiment.

FIG. 5(*b*) is an x-y diagram (top perspective view) illustrating the schematic structure of the battery 2100 according to the second embodiment.

As illustrated in FIG. 5, the second region 320 may be positioned within the region where the electrode layer 100 and the counter electrode layer 200 face each other and also outside the region where the electrode layer 100 and the counter electrode layer 200 face each other. In this manner, the second region 320 can be placed on the four sides of the battery and to be more remote from the center portion of the battery. Thus, the heat dissipating property by the second region 320 can be further enhanced.

The second region 320 may be a region in contact with at least one of the electrode layer 100 and the counter electrode layer 200. For example, as illustrated in FIG. 4 or 5, the second region 320 may be a region in contact with both of the electrode layer 100 and the counter electrode layer 200.

Figure 6:
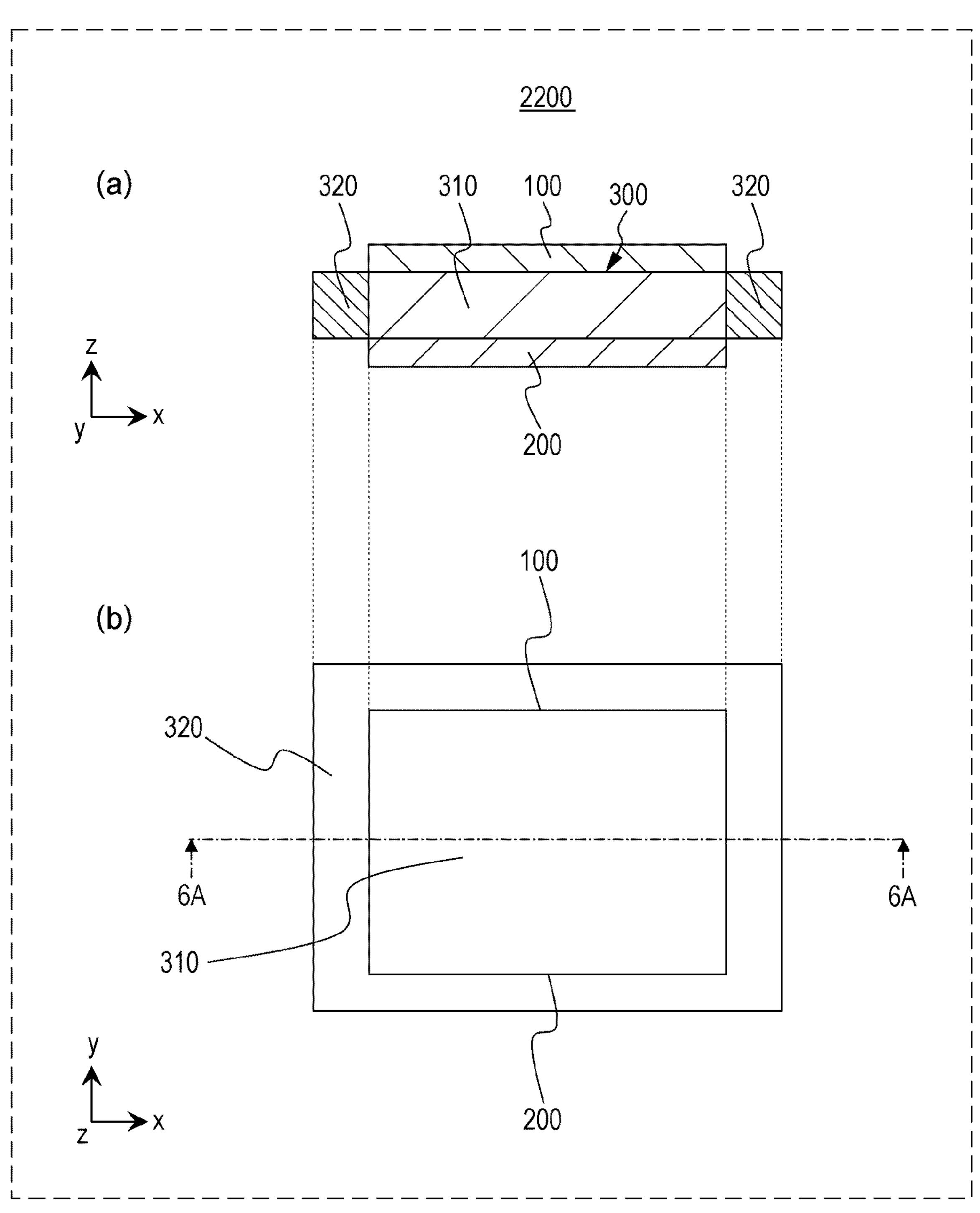
FIG. 6 illustrates a schematic structure of a battery according to the second embodiment.

FIG. 6 illustrates a schematic structure of a battery 2200 according to the second embodiment.

FIG. 6(*a*) is an x-z diagram (6A cross-sectional view) illustrating the schematic structure of the battery 2200 according to the second embodiment.

FIG. 6(*b*) is an x-y diagram (top perspective view) illustrating the schematic structure of the battery 2200 according to the second embodiment.

As illustrated in FIG. 6, the second region 320 may be positioned only outside the region where the electrode layer 100 and the counter electrode layer 200 face each other. In this manner, the second region 320 can be placed to be more remote from the center portion of the battery. Thus, the heat dissipating property by the second region 320 can be further enhanced. Furthermore, the area of the first region 310 positioned within the region where the electrode layer 100 and the counter electrode layer 200 face each other can be further increased. In other words, the area of the first region 310, which has a function of transferring metal ions, between the electrode layer 100 and the counter electrode layer 200 can be further increased.

As described above, in the present disclosure, "the second region 320 surrounds the first region 310" also encompasses the structures (in other words, the arrangement of the second region 320) illustrated in FIGS. 4 to 6. In other words, "the second region 320 surrounds the first region 310" encompasses, for example, "the second region 320 contacts all of the end portions of the first region 310". In other words, for example, when the first region 310 has a rectangular shape (for example, a quadrilateral shape) as illustrated in FIGS. 4 to 6, the second region 320 may be in contact with all of the sides of this shape. For example, the outer peripheral side surface of the first region 310 may be bonded to the inner peripheral side surface of the second region 320.

Third Embodiment

The third embodiment will now be described. Descriptions for the features overlapping those of the first and second embodiments are omitted as appropriate.

Figure 7:
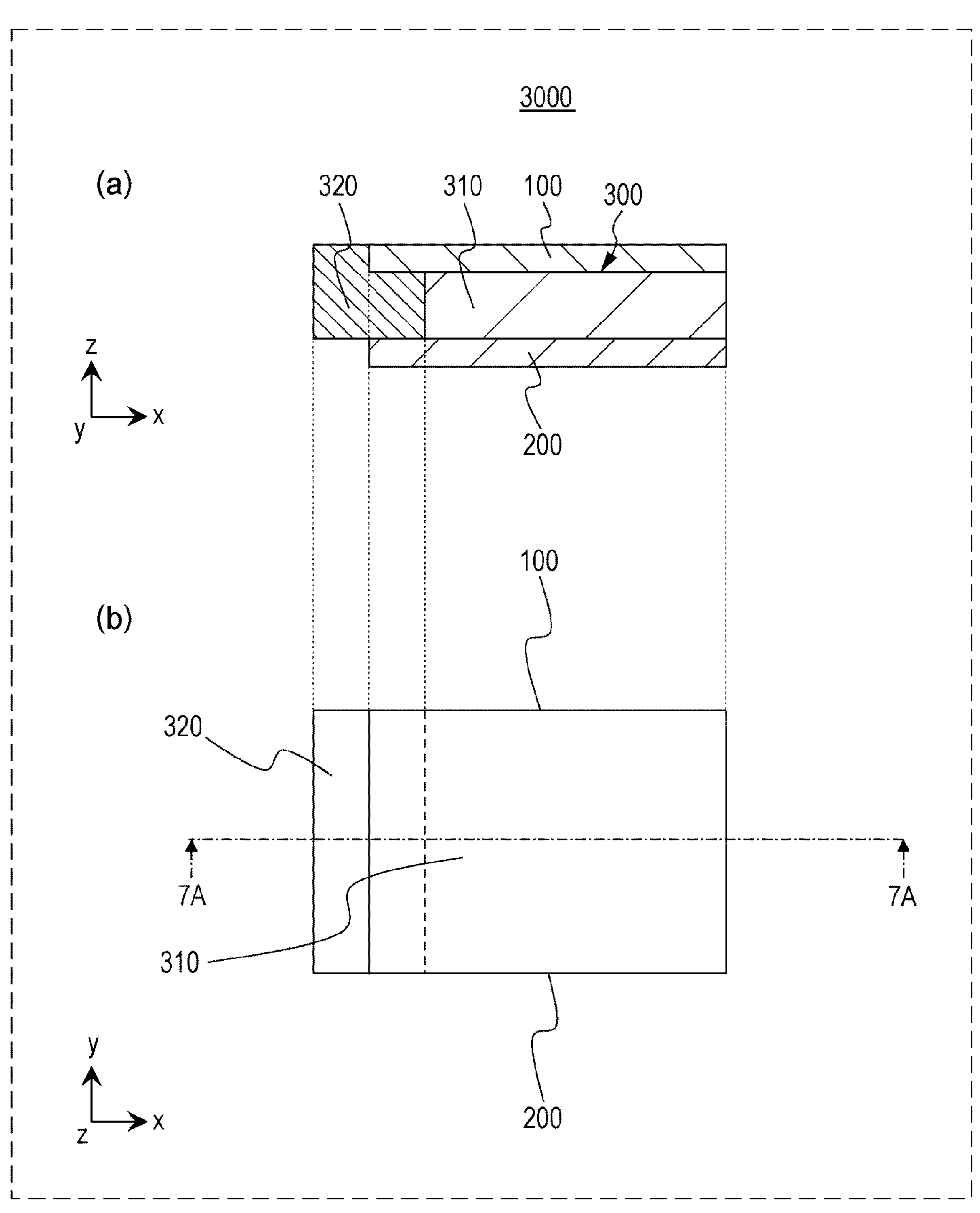
FIG. 7 illustrates a schematic structure of a battery according to a third embodiment.

FIG. 7 illustrates a schematic structure of a battery 3000 according to the third embodiment.

FIG. 7(*a*) is an x-z diagram (7A cross-sectional view) illustrating the schematic structure of the battery 3000 according to the third embodiment.

FIG. 7(*b*) is an x-y diagram (top perspective view) illustrating the schematic structure of the battery 3000 according to the third embodiment.

The battery 3000 according to the third embodiment further includes the following features in addition to the features of the battery 1000 of the first embodiment described above.

That is, in the battery 3000 of the third embodiment, the second region 320 is in contact with an end portion (for example, a side surface) of the electrode layer 100.

According to the above-described structure, the second region 320, which has a high solid electrolyte material density, can be disposed to be in contact with the outer rim portion (for example, at least one end portion) of the electrode layer 100. As a result, the heat from the electrode layer 100 is easily transferred (dissipated) to the second region 320. As a result, the heat generated in the center portion of the battery (in other words, heat generated in the electrode layer 100) can be more easily dissipated to the surface of the solid electrolyte layer 300 (and the outside of the battery).

According to the above-described structure, the outer rim portion (for example, at least one end portion) of the electrode layer 100 can be covered with the second region 320 having a higher strength. Thus, breaking of the outer rim portion of the electrode layer 100, which has a relatively low strength (for example, collapse of the electrode material), can be suppressed by the second region 320. Thus, the strength of the battery can be further improved.

According to the above-described structure, the second region 320 having a higher solid electrolyte material density can be interposed between the outer rim portion of the electrode layer 100 and the outside of the battery (for example, outside air). As a result, for example, the outside air (for example, atmospheric air, humid air, or the like) coming into the outer rim portion of the electrode layer 100 can be blocked by the second region 320. Thus, the environmental resistance of the battery can be further improved.

As illustrated in FIG. 7, the second region 320 may be in contact with only one end portion of the electrode layer 100. For example, when the electrode layer 100 has a rectangular shape (for example, a quadrilateral shape) as illustrated in FIG. 7, the second region 320 may be disposed to be in contact with only one side of this shape.

Alternatively, the second region 320 may be in contact with two or more end portions among the end portions of the electrode layer 100. For example, when the electrode layer 100 has a rectangular shape (for example, a quadrilateral shape) as illustrated in FIG. 7, the second region 320 may be disposed to be in contact with two or more sides of this shape. In this manner, the heat dissipating property (and strength, environmental resistance, etc.) can be enhanced at the two or more end portions.

Figure 8:
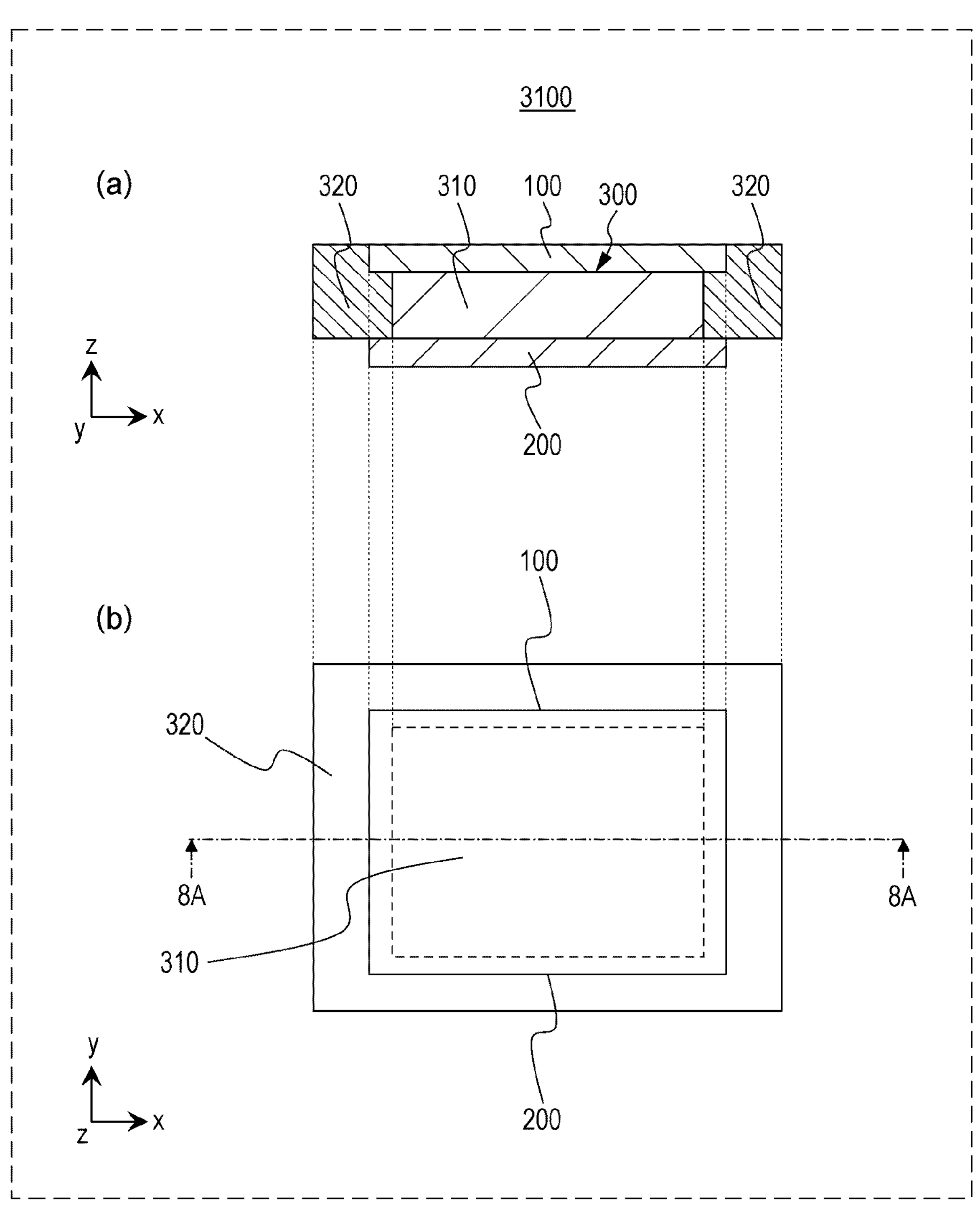
FIG. 8 illustrates a schematic structure of a battery according to the third embodiment.

FIG. 8 illustrates a schematic structure of a battery 3100 according to the third embodiment.

FIG. 8(*a*) is an x-z diagram (8A cross-sectional view) illustrating the schematic structure of the battery 3100 according to the third embodiment.

FIG. 8(*b*) is an x-y diagram (top perspective view) illustrating the schematic structure of the battery 3100 according to the third embodiment.

As illustrated in FIG. 8, the second region 320 may surround the electrode layer 100.

According to the above-described structure, the second region 320, which has a high solid electrolyte material density, can be disposed to be in contact with the outer rim portion on the four sides (for example, the entire outer rim portion) of the electrode layer 100. As a result, the heat from the electrode layer 100 is easily transferred (dissipated) to the second region 320 close to the parts where heat has been generated. As a result, the heat generated in the center portion of the battery (in other words, heat generated in the electrode layer 100) can be more easily dissipated to the surface of the solid electrolyte layer 300 (and the outside of the battery).

According to the above-described structure, the outer rim portion on the four sides (for example, the entire outer rim) of the electrode layer 100 can be covered with the second region 320 having a higher strength. Thus, breaking of the outer rim portion on the four sides of the electrode layer 100, which has a relatively low strength (for example, collapse of the electrode material), can be further suppressed by the second region 320. Thus, the strength of the battery can be further improved.

According to the above-described structure, the second region 320 having a higher solid electrolyte material density can be interposed between the outer rim portion on the four sides of the electrode layer 100 and the outside of the battery (for example, outside air). As a result, for example, the outside air (for example, atmospheric air, humid air, or the like) coming into the outer rim portion on the four sides of the electrode layer 100 can be blocked by the second region 320. Thus, the environmental resistance of the battery can be further improved.

Figure 9:
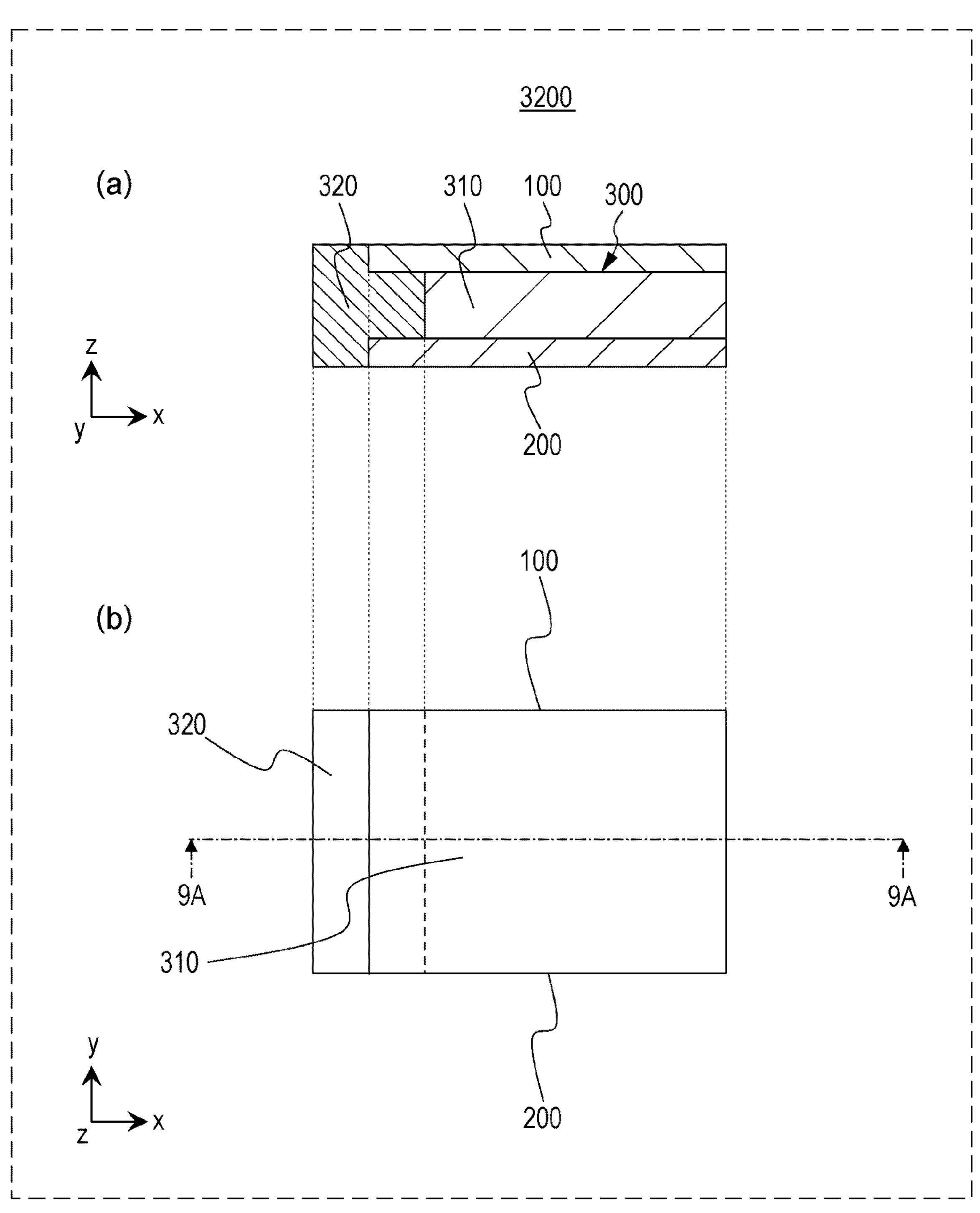
FIG. 9 illustrates a schematic structure of a battery according to the third embodiment.

FIG. 9 illustrates a schematic structure of a battery 3200 according to the third embodiment.

FIG. 9(*a*) is an x-z diagram (9A cross-sectional view) illustrating the schematic structure of the battery 3200 according to the third embodiment.

FIG. 9(*b*) is an x-y diagram (top perspective view) illustrating the schematic structure of the battery 3200 according to the third embodiment.

The battery 3200 according to the third embodiment further includes the following features in addition to the features of the battery 3000 of the third embodiment described above.

That is, in the battery 3200 of the third embodiment, the second region 320 is in contact with an end portion (for example, a side surface) of the counter electrode layer 200.

According to the above-described structure, the second region 320, which has a high solid electrolyte material density, can be disposed to be in contact with the outer rim portion (for example, at least one end portion) of the counter electrode layer 200. As a result, the heat from the counter electrode layer 200 is easily transferred (dissipated) to the second region 320. As a result, the heat generated in the center portion of the battery (in other words, heat generated in the counter electrode layer 200) can be more easily dissipated to the surface of the solid electrolyte layer 300 (and the outside of the battery).

According to the above-described structure, the outer rim portion (for example, at least one end portion) of the counter electrode layer 200 can be covered with the second region 320 having a higher strength. Thus, breaking of the outer rim portion of the counter electrode layer 200, which has a relatively low strength (for example, collapse of the electrode material), can be suppressed by the second region 320. Thus, the strength of the battery can be further improved.

According to the above-described structure, the second region 320 having a higher solid electrolyte material density can be interposed between the outer rim portion of the counter electrode layer 200 and the outside of the battery (for example, outside air). As a result, for example, the outside air (for example, atmospheric air, humid air, or the like) coming into the outer rim portion of the counter electrode layer 200 can be blocked by the second region 320. Thus, the environmental resistance of the battery can be further improved.

As illustrated in FIG. 9, the second region 320 may be in contact with only one end portion of the counter electrode layer 200. For example, when the counter electrode layer 200 has a rectangular shape (for example, a quadrilateral shape) as illustrated in FIG. 9, the second region 320 may be disposed to be in contact with only one side of this shape.

Alternatively, the second region 320 may be in contact with two or more end portions among the end portions of the counter electrode layer 200. For example, when the counter electrode layer 200 has a rectangular shape (for example, a quadrilateral shape) as illustrated in FIG. 9, the second region 320 may be disposed to be in contact with two or more sides of this shape. In this manner, the heat dissipating property (and strength, environmental resistance, etc.) can be enhanced at the two or more end portions.

Figure 10:
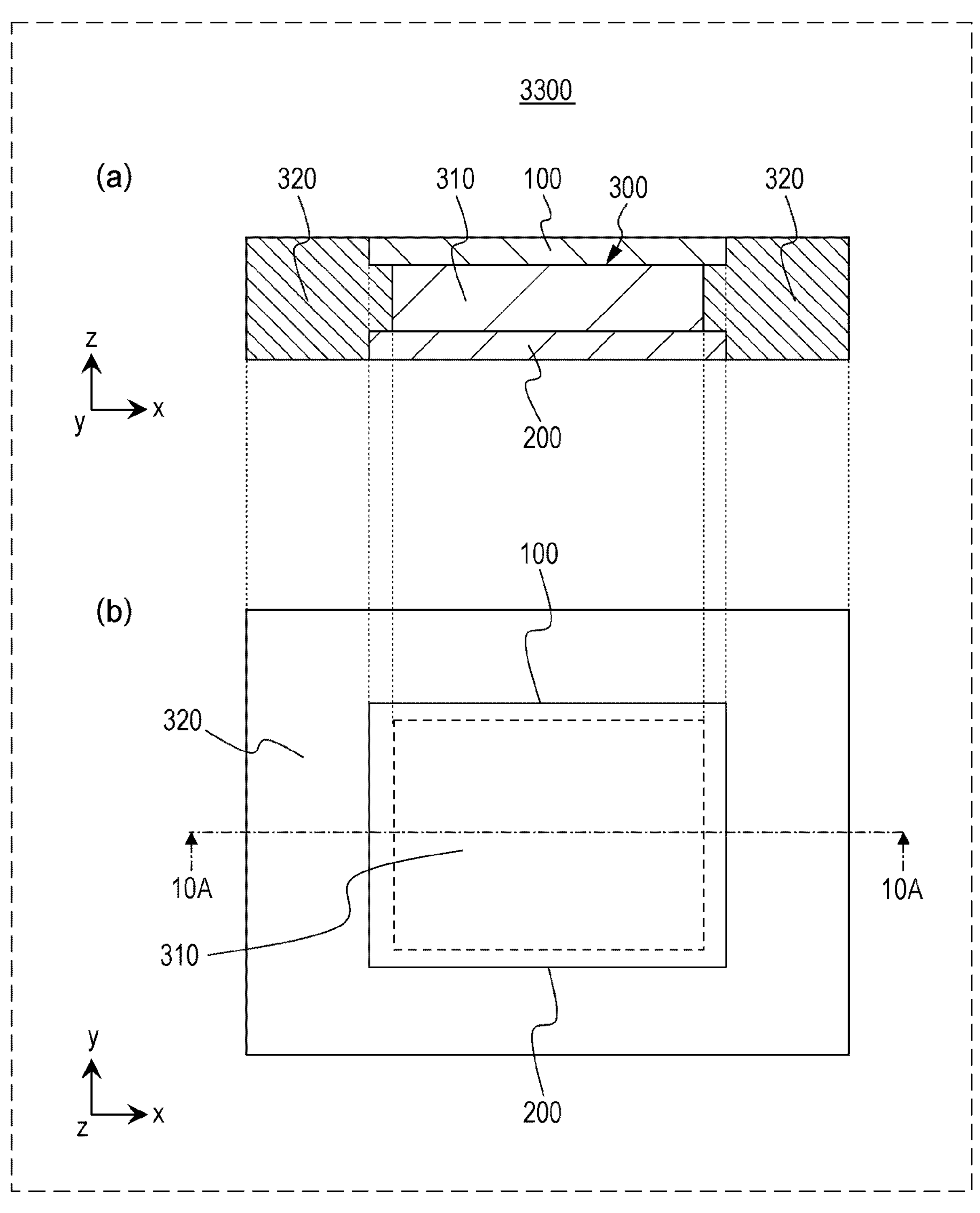
FIG. 10 illustrates a schematic structure of a battery according to the third embodiment.

FIG. 10 illustrates a schematic structure of a battery 3300 according to the third embodiment.

FIG. 10(*a*) is an x-z diagram (10A cross-sectional view) illustrating the schematic structure of the battery 3300 according to the third embodiment.

FIG. 10(*b*) is an x-y diagram (top perspective view) illustrating the schematic structure of the battery 3300 according to the third embodiment.

As illustrated in FIG. 10, the second region 320 may surround the counter electrode layer 200.

According to the above-described structure, the second region 320, which has a high solid electrolyte material density, can be disposed to be in contact with the outer rim portion on the four sides (for example, the entire outer rim portion) of the counter electrode layer 200. As a result, the heat from the counter electrode layer 200 is easily transferred (dissipated) to the second region 320 close to the parts where heat has been generated. As a result, the heat generated in the center portion of the battery (in other words, heat generated in the counter electrode layer 200) can be more easily dissipated to the surface of the solid electrolyte layer 300 (and the outside of the battery).

According to the above-described structure, the outer rim portion on the four sides (for example, the entire outer rim) of the counter electrode layer 200 can be covered with the second region 320 having a higher strength. Thus, breaking of the outer rim portion on the four sides of the counter electrode layer 200, which has a relatively low strength (for example, collapse of the electrode material), can be further suppressed by the second region 320. Thus, the strength of the battery can be further improved.

According to the above-described structure, the second region 320 having a higher solid electrolyte material density can be interposed between the outer rim portion on the four sides of the counter electrode layer 200 and the outside of the battery (for example, outside air). As a result, for example, the outside air (for example, atmospheric air, humid air, or the like) coming into the outer rim portion on the four sides of the counter electrode layer 200 can be blocked by the second region 320. Thus, the environmental resistance of the battery can be further improved.

In the present disclosure, "the second region 320 surrounds the electrode layer 100 (or the counter electrode layer 200)" encompasses, for example, "the second region 320 contacts all of the end portions of the electrode layer 100 (or the counter electrode layer 200)". In other words, for example, when the electrode layer 100 (or the counter electrode layer 200) has a rectangular shape (for example, a quadrilateral shape), the second region 320 may be in contact with all of the sides of this shape.

As illustrated in FIGS. 7 to 10, the second region 320 may be also positioned within the region where the electrode layer 100 and the counter electrode layer 200 face each other. Alternatively, the second region 320 may be positioned only outside the region where the electrode layer 100 and the counter electrode layer 200 face each other.

Figure 11:
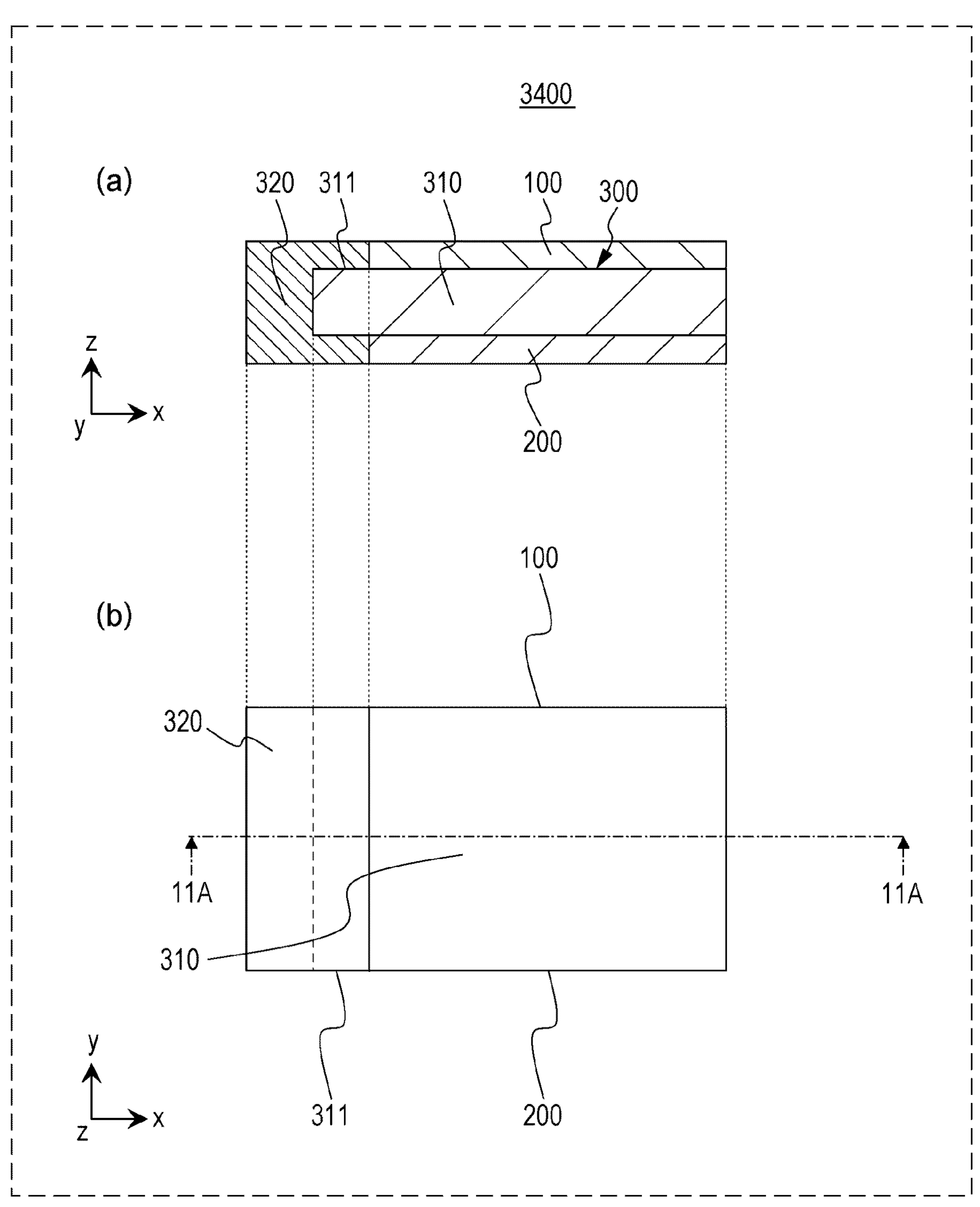
FIG. 11 illustrates a schematic structure of a battery according to the third embodiment.

FIG. 11 illustrates a schematic structure of a battery 3400 according to the third embodiment.

FIG. 11(*a*) is an x-z diagram (11A cross-sectional view) illustrating the schematic structure of the battery 3400 according to the third embodiment.

FIG. 11(*b*) is an x-y diagram (top perspective view) illustrating the schematic structure of the battery 3400 according to the third embodiment.

As illustrated in FIG. 11, the first region 310 may have a first projecting portion 311.

The first projecting portion 311 is a portion that projects outward from the region where the electrode layer 100 and the counter electrode layer 200 face each other.

Here, the second region 320 may cover the first projecting portion 311.

According to the above-described structure, the contact area between the first region 310 and the second region 320 can be further increased. Thus, the heat from the center portion of the solid electrolyte layer 300 is easily transferred (dissipated) to the outer rim portion of the solid electrolyte layer 300. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

As illustrated in FIG. 11, the second region 320 may be in contact with an end portion (for example, a side surface) of the electrode layer 100 and an end portion (for example, a side surface) of the counter electrode layer 200.

Figure 12:
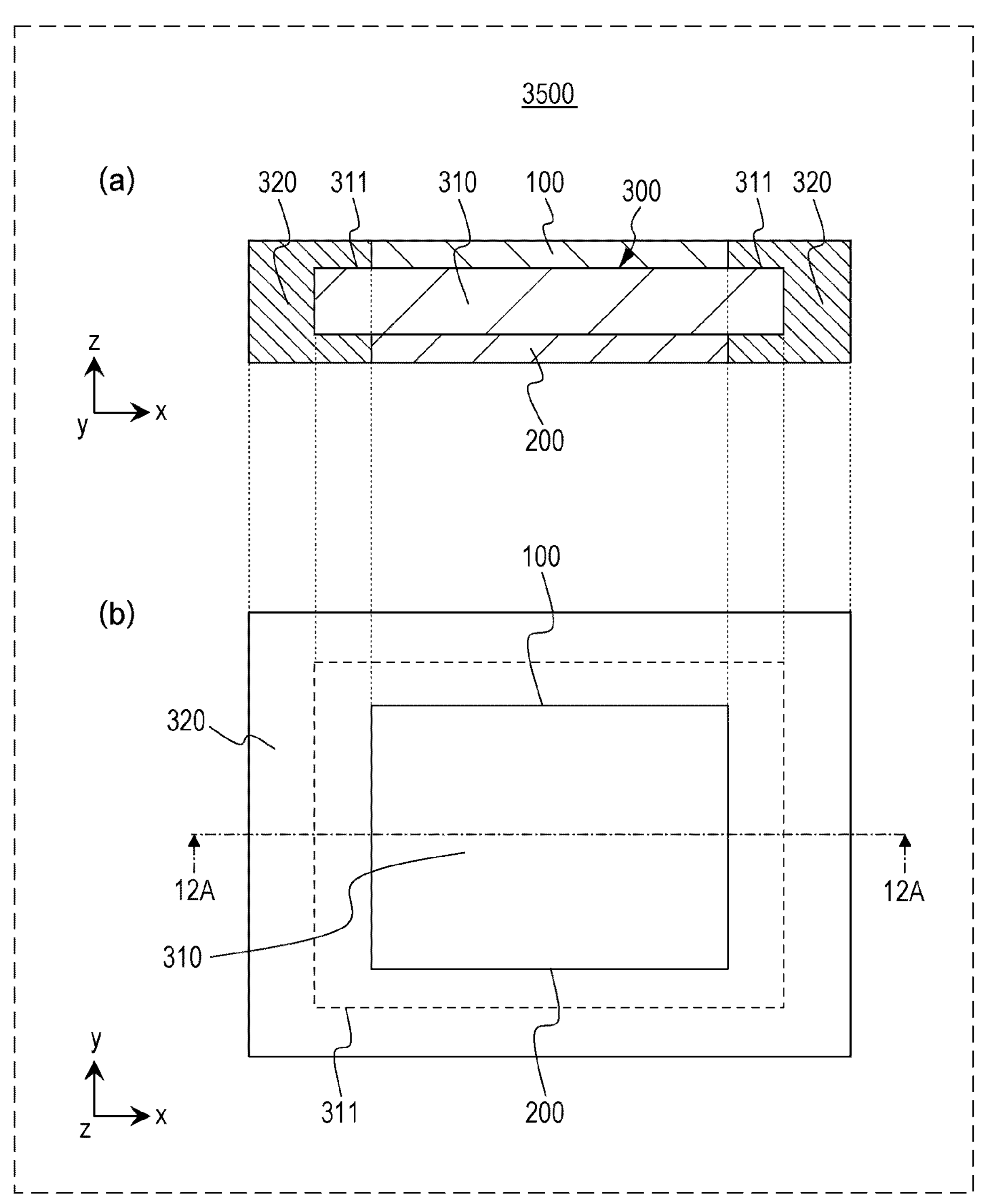
FIG. 12 illustrates a schematic structure of a battery according to the third embodiment.

FIG. 12 illustrates a schematic structure of a battery 3500 according to the third embodiment.

FIG. 12(*a*) is an x-z diagram (12A cross-sectional view) illustrating the schematic structure of the battery 3500 according to the third embodiment.

FIG. 12(*b*) is an x-y diagram (top perspective view) illustrating the schematic structure of the battery 3500 according to the third embodiment.

As illustrated in FIG. 12, the first projecting portion 311 may surround the region where the electrode layer 100 and the counter electrode layer 200 face each other.

Here, the second region 320 may cover the first projecting portion 311 exposing from around the region where the electrode layer 100 and the counter electrode layer 200 face each other.

According to the above-described structure, the contact area between the first region 310 and the second region 320 can be further increased. In this manner, the heat from the center portion of the solid electrolyte layer 300 is easily transferred (dissipated) to the outer rim portion of the solid electrolyte layer 300 close to the parts where heat has been generated. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

As illustrated in FIG. 12, the second region 320 may surround the electrode layer 100 and the counter electrode layer 200.

Fourth Embodiment

The fourth embodiment will now be described. Descriptions for the features overlapping those of the first to third embodiments are omitted as appropriate.

Figure 13:
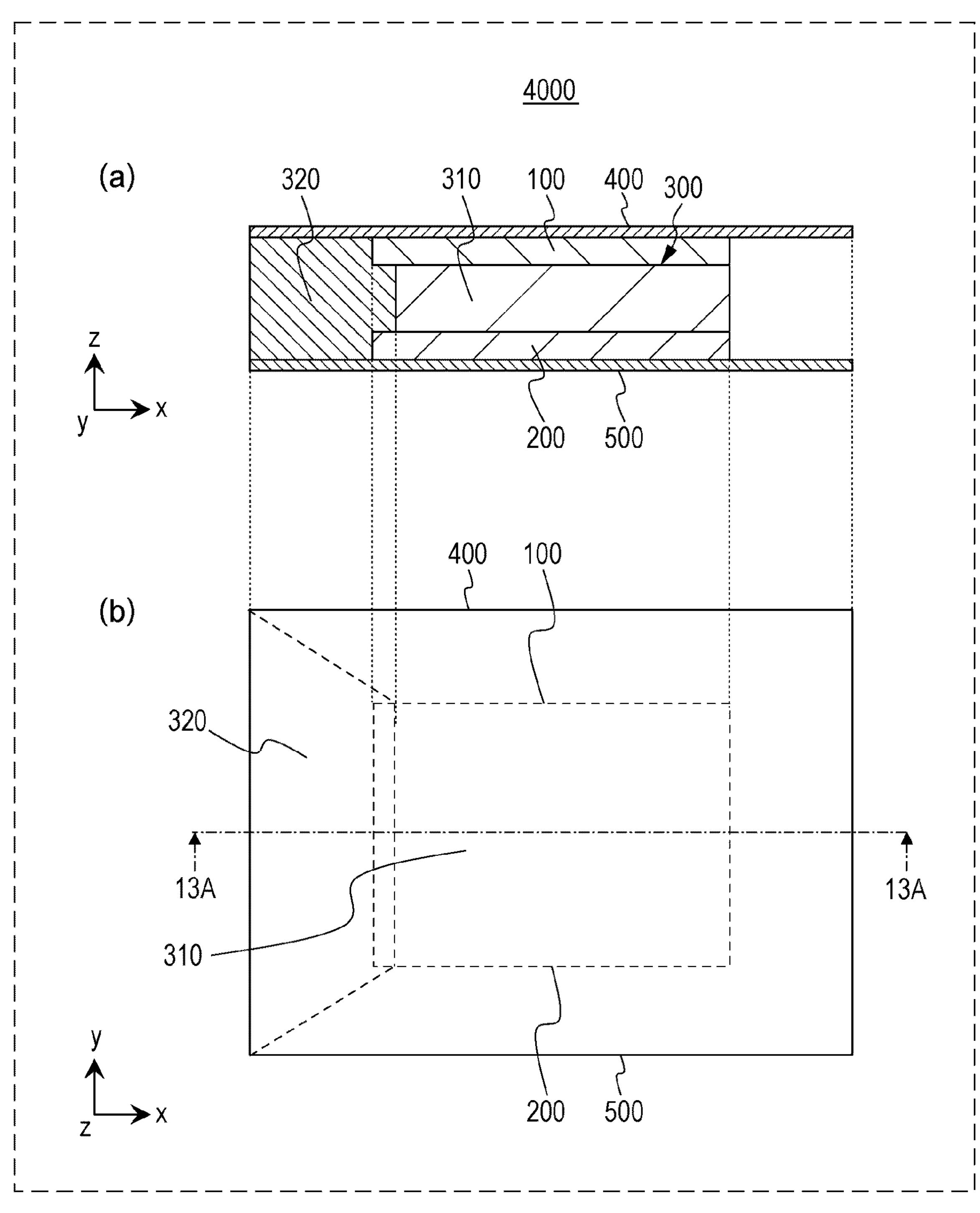
FIG. 13 illustrates a schematic structure of a battery according to a fourth embodiment.

FIG. 13 illustrates a schematic structure of a battery 4000 according to the fourth embodiment.

FIG. 13(*a*) is an x-z diagram (13A cross-sectional view) illustrating the schematic structure of the battery 4000 according to the fourth embodiment.

FIG. 13(*b*) is an x-y diagram (top perspective view) illustrating the schematic structure of the battery 4000 according to the fourth embodiment.

The battery 4000 according to the fourth embodiment further includes the following features in addition to the features of the battery 1000 of the first embodiment described above.

That is, the battery 4000 of the fourth embodiment further includes an electrode current collector 400 and a counter electrode current collector 500.

The electrode current collector 400 is a current collector electrically coupled to the electrode layer 100.

The counter electrode current collector 500 is a current collector electrically coupled to the counter electrode layer 200.

The second region 320 is positioned between the electrode current collector 400 and the counter electrode current collector 500 and is in contact with the electrode current collector 400 and the counter electrode current collector 500.

According to the above-described structure, short-circuiting caused by contact between the electrode current collector 400 and the counter electrode current collector 500 can be suppressed. In other words, the second region 320, which has a high solid electrolyte material density (in other words, a high strength), can function as a high-strength skeleton structure in the outer rim portion of the solid electrolyte layer 300 (in other words, the outer rim portion of the electrode current collector 400 and the counter electrode current collector 500). As a result, the second region 320 suppresses deformation or structural defects in the outer rim portion of the electrode current collector 400 and the counter electrode current collector 500. Thus, for example, when the battery has a large area and a reduced layer thickness (for example, a battery designed as a high-output, high-capacity battery) or when the battery is an all-solid battery not equipped with separators, short-circuiting caused by contact between the electrode current collector 400 and the counter electrode current collector 500 can be suppressed by the second region 320. Thus, the deformation resistance and impact resistance of the battery can be further enhanced.

As illustrated in FIG. 13, the electrode current collector 400 may be electrically coupled to the electrode layer 100 by making direct contact with the electrode layer 100. Alternatively, a separate conductive member may be interposed between the electrode current collector 400 and the electrode layer 100.

As illustrated in FIG. 13, the electrode current collector 400 may be larger in size than the electrode layer 100. For example, the area of the main surface of the electrode current collector 400 may be larger than the area of the main surface of the electrode layer 100. In other words, the electrode layer 100 may be formed in a range narrower than the electrode current collector 400.

As illustrated in FIG. 13, the counter electrode current collector 500 may be electrically coupled to the counter electrode layer 200 by making direct contact with the counter electrode layer 200. Alternatively, a separate conductive member may be interposed between the counter electrode current collector 500 and the counter electrode layer 200.

As illustrated in FIG. 13, the counter electrode current collector 500 may be larger in size than the counter electrode layer 200. For example, the area of the main surface of the counter electrode current collector 500 may be larger than the area of the main surface of the counter electrode layer 200. In other words, the counter electrode layer 200 may be formed in a range narrower than the counter electrode current collector 500.

As illustrated in FIG. 13, the second region 320 may be positioned within the region where the electrode current collector 400 and the counter electrode current collector 500 face each other without the electrode layer 100 and the counter electrode layer 200 therebetween among the region where the electrode current collector 400 and the counter electrode current collector 500 face each other.

In the present disclosure, "the region where the electrode current collector 400 and the counter electrode current collector 500 face each other" encompasses, for example, "when viewed in a stacking direction of the electrode current collector 400 and the counter electrode current collector 500 (in other words, in the z direction in the drawing), a region where a part of a main surface (or the entire main surface) of the electrode current collector 400 overlaps a part of a main surface (or the entire main surface) of the counter electrode current collector 500 (in other words, the overlapping region)".

In the present disclosure, "the structure in which the electrode current collector 400 and the counter electrode current collector 500 face each other" encompasses, for example, "a structure in which another member (for example, the electrode layer 100, the counter electrode layer 200, the solid electrolyte layer 300, etc.) is disposed between the main surface of the electrode current collector 400 and the main surface of the counter electrode current collector 500 that face each other.

The electrode layer 100 may be a positive electrode layer. In this case, the electrode active material is a positive electrode active material. The electrode current collector 400 is a positive electrode current collector. The counter electrode layer 200 is a negative electrode layer. The counter electrode active material is a negative electrode active material. The counter electrode current collector 500 is a negative electrode current collector.

Alternatively, the electrode layer 100 may be a negative electrode layer. In this case, the electrode active material is a negative electrode active material. The electrode current collector 400 is a negative electrode current collector. The counter electrode layer 200 is a positive electrode layer. The counter electrode active material is a positive electrode active material. The counter electrode current collector 500 is a positive electrode current collector.

Examples of the positive electrode current collector that can be used include metal films (for example, metal foils) composed of metal materials (for example, aluminum, copper, and stainless steel). Examples of the positive electrode current collector that can be used also include metal films formed of alloys containing these metal materials. Another example of the positive electrode current collector that can be used is a member prepared by forming (or bonding) a film of the metal material on a film composed of a different material.

The thickness of the positive electrode current collector may be, for example, 5 to 100 μm.

Examples of the negative electrode current collector that can be used include metal films (for example, metal foils) composed of metal materials (for example, nickel, copper, and stainless steel). Examples of the negative electrode current collector that can be used also include metal films formed of alloys containing these metal materials. Another example of the negative electrode current collector that can be used is a member prepared by forming (or bonding) a film of the metal material on a film composed of a different material.

The thickness of the negative electrode current collector may be, for example, 5 to 100 μm.

As illustrated in FIG. 13, the second region 320 may be positioned at only one end portion of the electrode current collector 400 (and the counter electrode current collector 500). For example, when the electrode current collector 400 (and the counter electrode current collector 500) has a rectangular shape (for example, a quadrilateral shape) as illustrated in FIG. 13, the second region 320 may be disposed at only one side of this shape.

Alternatively, the second region 320 may be positioned at two or more end portions among the end portions of the electrode current collector 400 (and the counter electrode current collector 500). For example, when the electrode current collector 400 (and the counter electrode current collector 500) has a rectangular shape (for example, a quadrilateral shape) as illustrated in FIG. 13, the second region 320 may be disposed at two or more sides of this shape. In this manner, short-circuiting caused by contact between the electrode current collector 400 and the counter electrode current collector 500 can be suppressed at two or more end portions.

Figure 14:
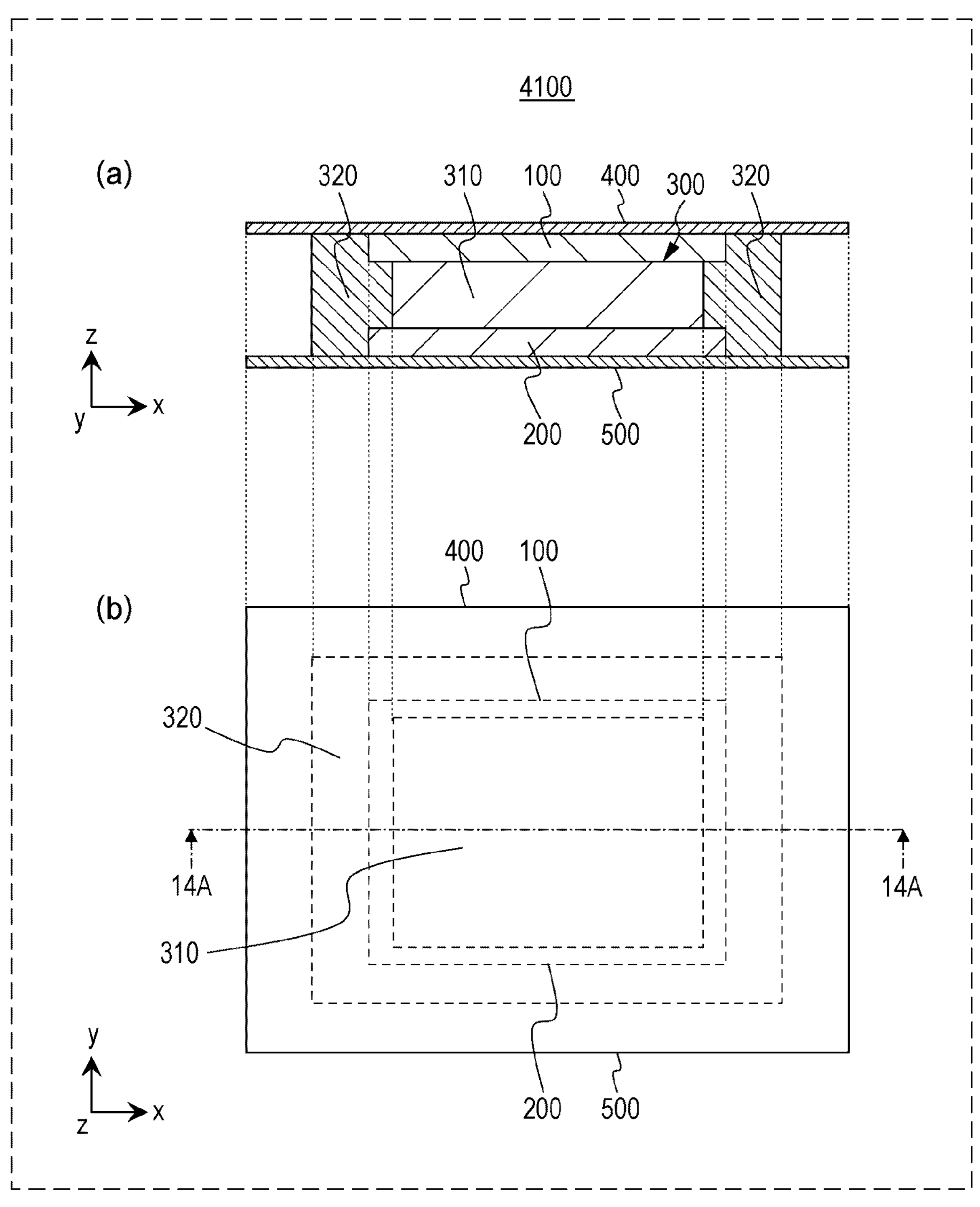
FIG. 14 illustrates a schematic structure of a battery according to the fourth embodiment.

FIG. 14 illustrates a schematic structure of a battery 4100 according to the fourth embodiment.

FIG. 14(*a*) is an x-z diagram (14A cross-sectional view) illustrating the schematic structure of the battery 4100 according to the fourth embodiment.

FIG. 14(*b*) is an x-y diagram (top perspective view) illustrating the schematic structure of the battery 4100 according to the fourth embodiment.

As illustrated in FIG. 14, the second region 320 may surround the first region 310, the electrode layer 100, and the counter electrode layer 200. Here, the second region 320 surrounding the first region 310, the electrode layer 100, and the counter electrode layer 200 may be in contact with the electrode current collector 400 and the counter electrode current collector 500. In this manner, short-circuiting caused by contact between the electrode current collector 400 and the counter electrode current collector 500 can be further suppressed around (for example, on the four sides of) the multilayer body constituted by the first region 310, the electrode layer 100, and the counter electrode layer 200.

Figure 15:
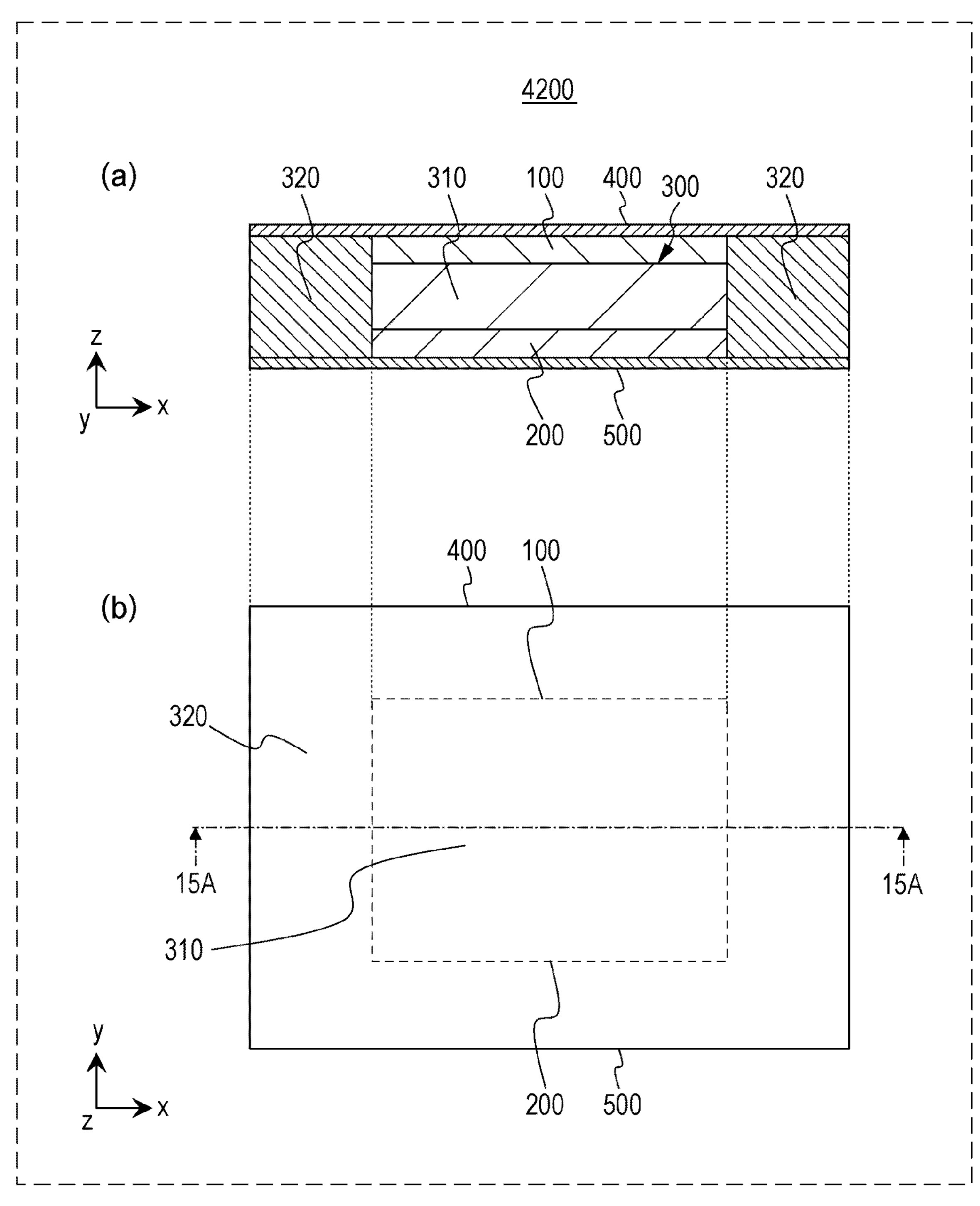
FIG. 15 illustrates a schematic structure of a battery according to the fourth embodiment.

FIG. 15 illustrates a schematic structure of a battery 4200 according to the fourth embodiment.

FIG. 15(*a*) is an x-z diagram (15A cross-sectional view) illustrating the schematic structure of the battery 4200 according to the fourth embodiment.

FIG. 15(*b*) is an x-y diagram (top perspective view) illustrating the schematic structure of the battery 4200 according to the fourth embodiment.

As illustrated in FIG. 15, the first region 310 may be positioned in the region where the electrode layer 100 and the counter electrode layer 200 face each other.

As illustrated in FIG. 15, the second region 320 may be positioned within the entire region where the electrode current collector 400 and the counter electrode current collector 500 face each other without the electrode layer 100 and the counter electrode layer 200 therebetween among the region where the electrode current collector 400 and the counter electrode current collector 500 face each other. In this manner, short-circuiting caused by contact between the electrode current collector 400 and the counter electrode current collector 500 can be further suppressed around (for example, on the four sides of) the multilayer body constituted by the first region 310, the electrode layer 100, and the counter electrode layer 200.

Figure 16:
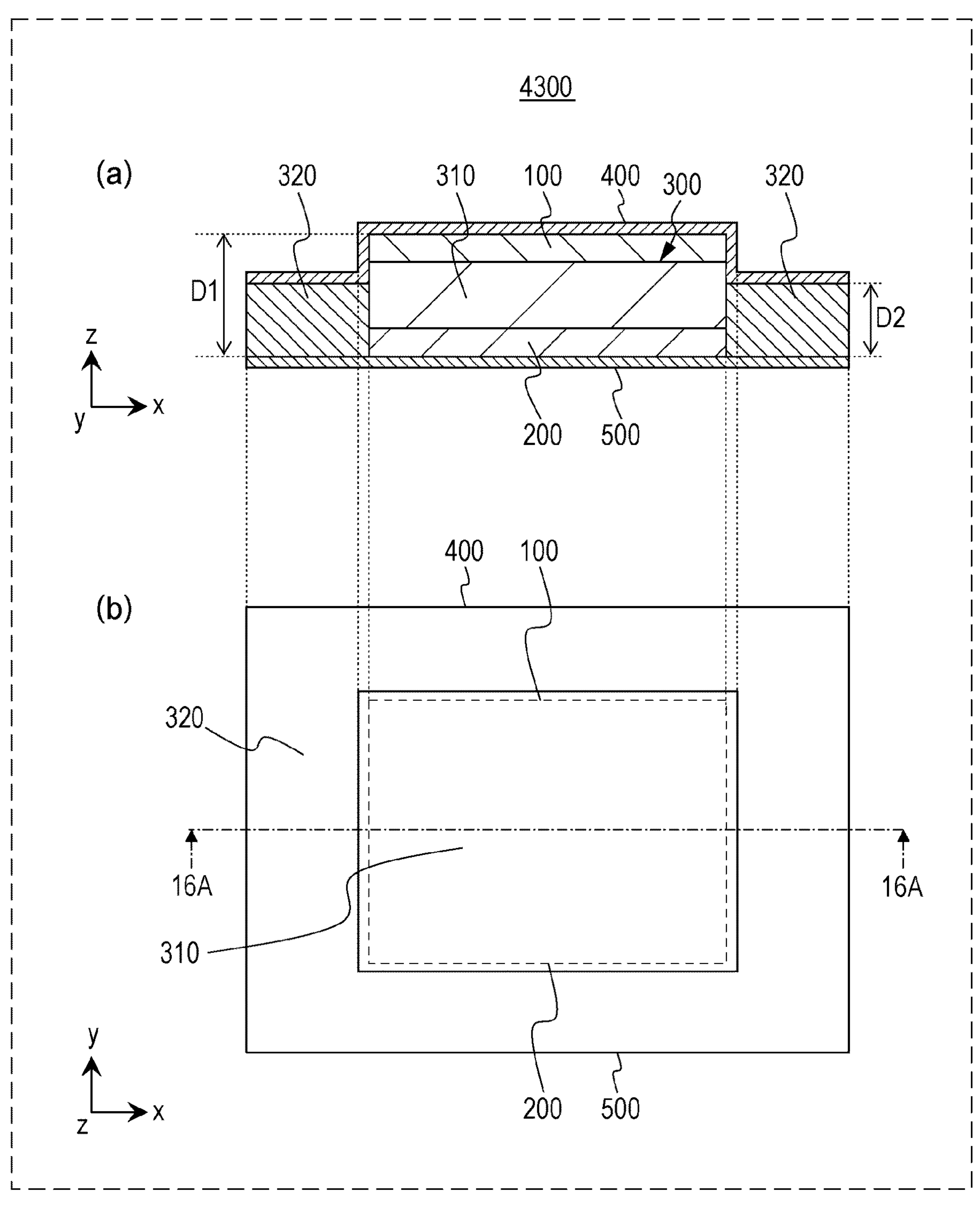
FIG. 16 illustrates a schematic structure of a battery according to the fourth embodiment.

FIG. 16 illustrates a schematic structure of a battery 4300 according to the fourth embodiment.

FIG. 16(*a*) is an x-z diagram (16A cross-sectional view) illustrating the schematic structure of the battery 4300 according to the fourth embodiment.

FIG. 16(*b*) is an x-y diagram (top perspective view) illustrating the schematic structure of the battery 4300 according to the fourth embodiment.

As illustrated in FIG. 16, the second distance D2 may be smaller than the first distance D1.

The first distance D1 is the distance between the electrode current collector 400 and the counter electrode current collector 500 at a position in which the first region 310 lies.

The second distance D2 is the distance between the electrode current collector 400 and the counter electrode current collector 500 at a position in which the second region 320 lies.

According to the above-described structure, a battery in which the outer rim portion of the solid electrolyte layer 300 (in other words, the outer rim portion of the electrode current collector 400 and the counter electrode current collector 500) is narrowed (in other words, a battery with narrowed outer peripheral side surfaces) can be configurated. Thus, the area of the exposed outer rim portion of the solid electrolyte layer 300 can be decreased. Thus, for example, the outside air (for example, atmospheric air, humid air, or the like) coming into the first region 310 can be more reliably blocked by the second region 320. Moreover, the durability (for example, the impact resistance) of the outer peripheral side surfaces of the battery can be further improved. Thus, the environmental resistance of the battery can be further improved.

Fifth Embodiment

The fifth embodiment will now be described. Descriptions for the features overlapping those of the first to fourth embodiments are omitted as appropriate.

Figure 17:
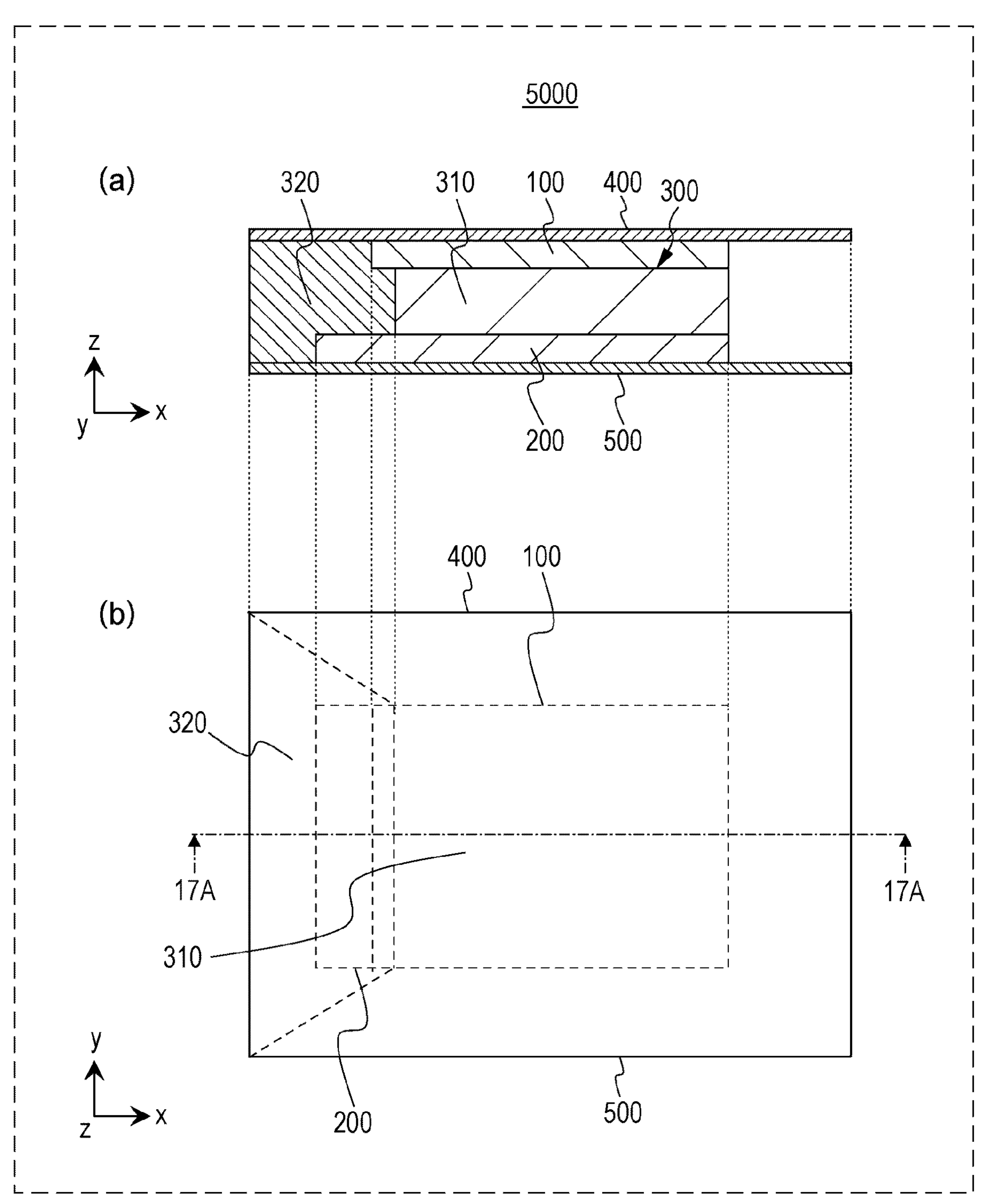
FIG. 17 illustrates a schematic structure of a battery according to a fifth embodiment.

FIG. 17 illustrates a schematic structure of a battery 5000 according to the fifth embodiment.

FIG. 17(*a*) is an x-z diagram (17A cross-sectional view) illustrating the schematic structure of the battery 5000 according to the fifth embodiment.

FIG. 17(*b*) is an x-y diagram (top perspective view) illustrating the schematic structure of the battery 5000 according to the fifth embodiment.

The battery 5000 according to the fifth embodiment further includes the following features in addition to the features of the battery 1000 of the first embodiment described above.

That is, in the battery 5000 of the fifth embodiment, the range in which the counter electrode layer 200 is formed is larger than the range in which the electrode layer 100 is formed.

Here, the electrode layer 100 is positioned within the range in which the counter electrode layer 200 is formed.

According to the above-described structure, since the counter electrode layer 200 is formed to have a larger area than the electrode layer 100, precipitation of metal (for example, lithium) in the counter electrode layer 200 can be suppressed. Thus, short-circuiting between the electrode layer 100 and the counter electrode layer 200 caused by metal precipitation can be prevented.

The counter electrode layer 200 may be larger in size than the electrode layer 100. For example, the area of the main surface of the counter electrode layer 200 may be larger than the area of the main surface of the electrode layer 100. In other words, the electrode layer 100 may be formed in a range narrower than the counter electrode layer 200. As illustrated in FIG. 17, one end portion of the counter electrode layer 200 may be larger than the electrode layer 100. Here, this end portion may be arranged not to face the electrode layer 100.

Figure 18:
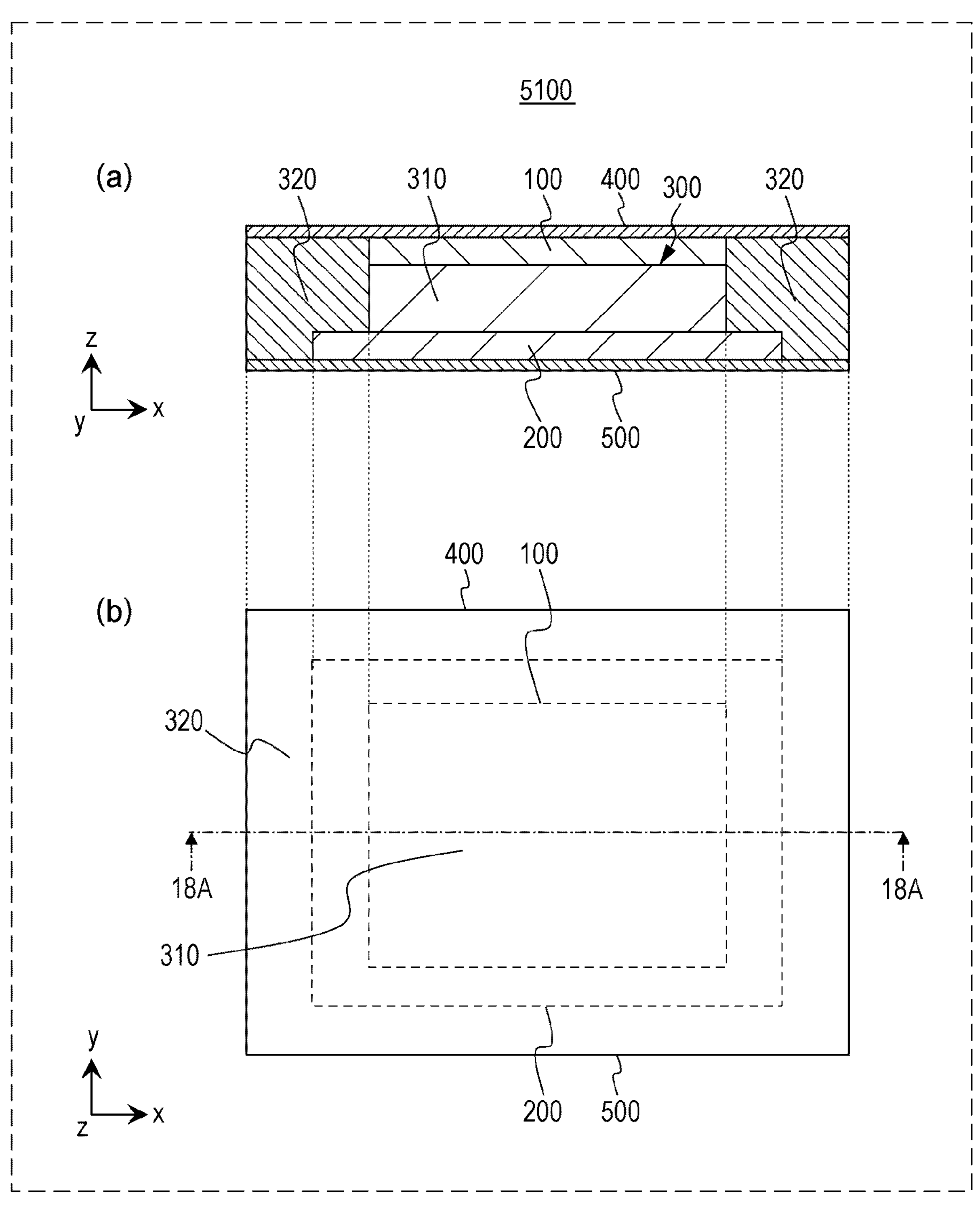
FIG. 18 illustrates a schematic structure of a battery according to the fifth embodiment.

FIG. 18 illustrates a schematic structure of a battery 5100 according to the fifth embodiment.

FIG. 18(*a*) is an x-z diagram (18A cross-sectional view) illustrating the schematic structure of the battery 5100 according to the fifth embodiment.

FIG. 18(*b*) is an x-y diagram (top perspective view) illustrating the schematic structure of the battery 5100 according to the fifth embodiment.

As illustrated in FIG. 18, the end portions (for example, all end portions) on the four sides of the counter electrode layer 200 may be arranged to not face the electrode layer 100. In this manner, precipitation of the metal (for example, lithium) in the counter electrode layer 200 can be further suppressed. Thus, short-circuiting between the electrode layer 100 and the counter electrode layer 200 caused by metal precipitation can be more reliably prevented.

As illustrated in FIGS. 17 and 18, the second region 320 may lie in a region where the electrode layer 100 is absent among the region facing the counter electrode layer 200 (for example, the region in which the counter electrode layer 200 and the electrode current collector 400 face each other without the electrode layer 100 therebetween).

Figure 19:
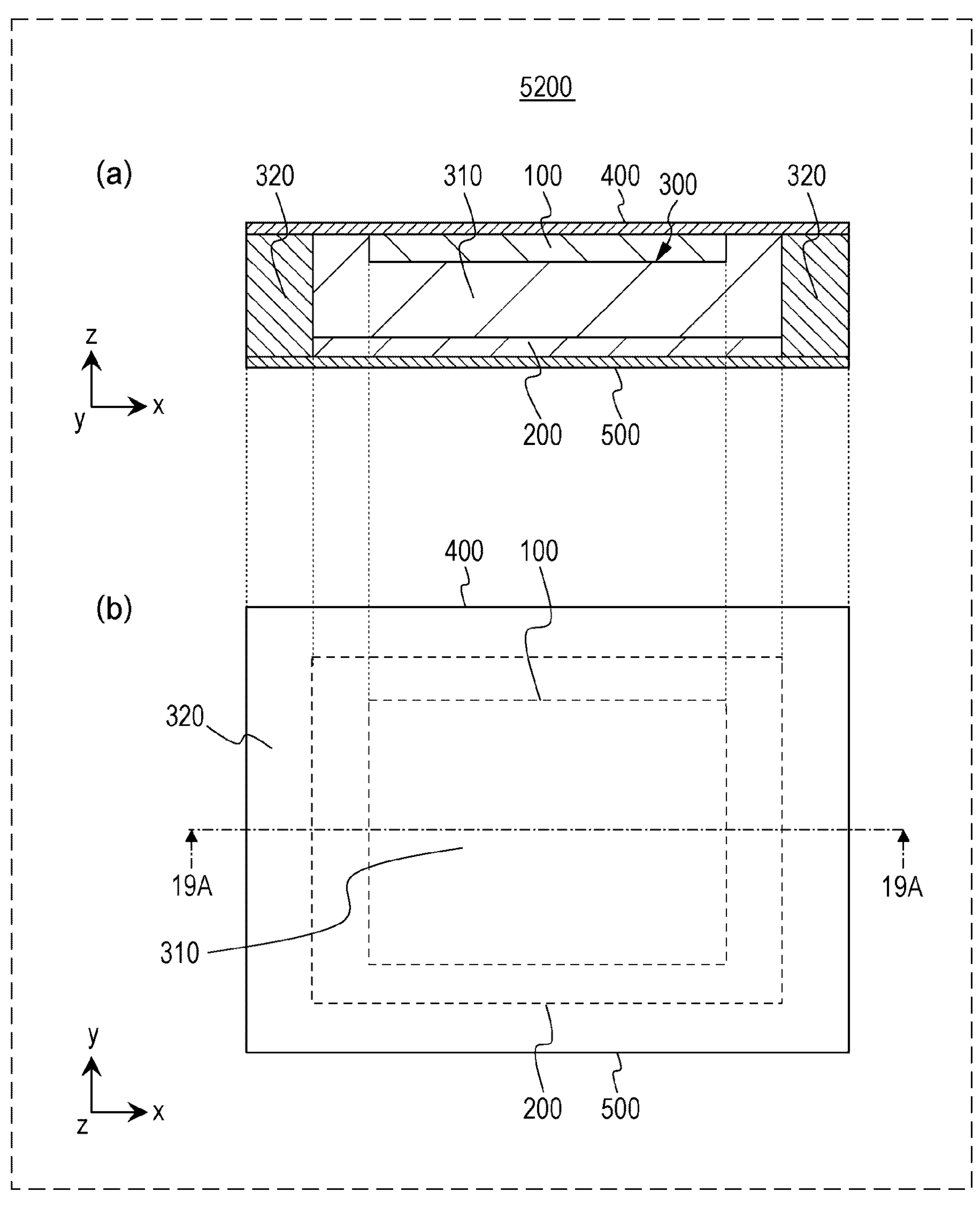
FIG. 19 illustrates a schematic structure of a battery according to the fifth embodiment.

FIG. 19 illustrates a schematic structure of a battery 5200 according to the fifth embodiment.

FIG. 19(*a*) is an x-z diagram (19A cross-sectional view) illustrating the schematic structure of the battery 5200 according to the fifth embodiment.

FIG. 19(*b*) is an x-y diagram (top perspective view) illustrating the schematic structure of the battery 5200 according to the fifth embodiment.

As illustrated in FIG. 19, the first region 310 may lie in a region where the electrode layer 100 is absent among the region facing the counter electrode layer 200 (for example, the region in which the counter electrode layer 200 and the electrode current collector 400 face each other without the electrode layer 100 therebetween). In this manner, the area of the first region 310 positioned within the region where the electrode layer 100 and the counter electrode layer 200 face each other can be further increased. In other words, the area of the first region 310, which has a function of transferring metal ions, between the electrode layer 100 and the counter electrode layer 200 can be further increased. In this manner, precipitation of the metal (for example, lithium) in the counter electrode layer 200 can be further suppressed.

Figure 20:
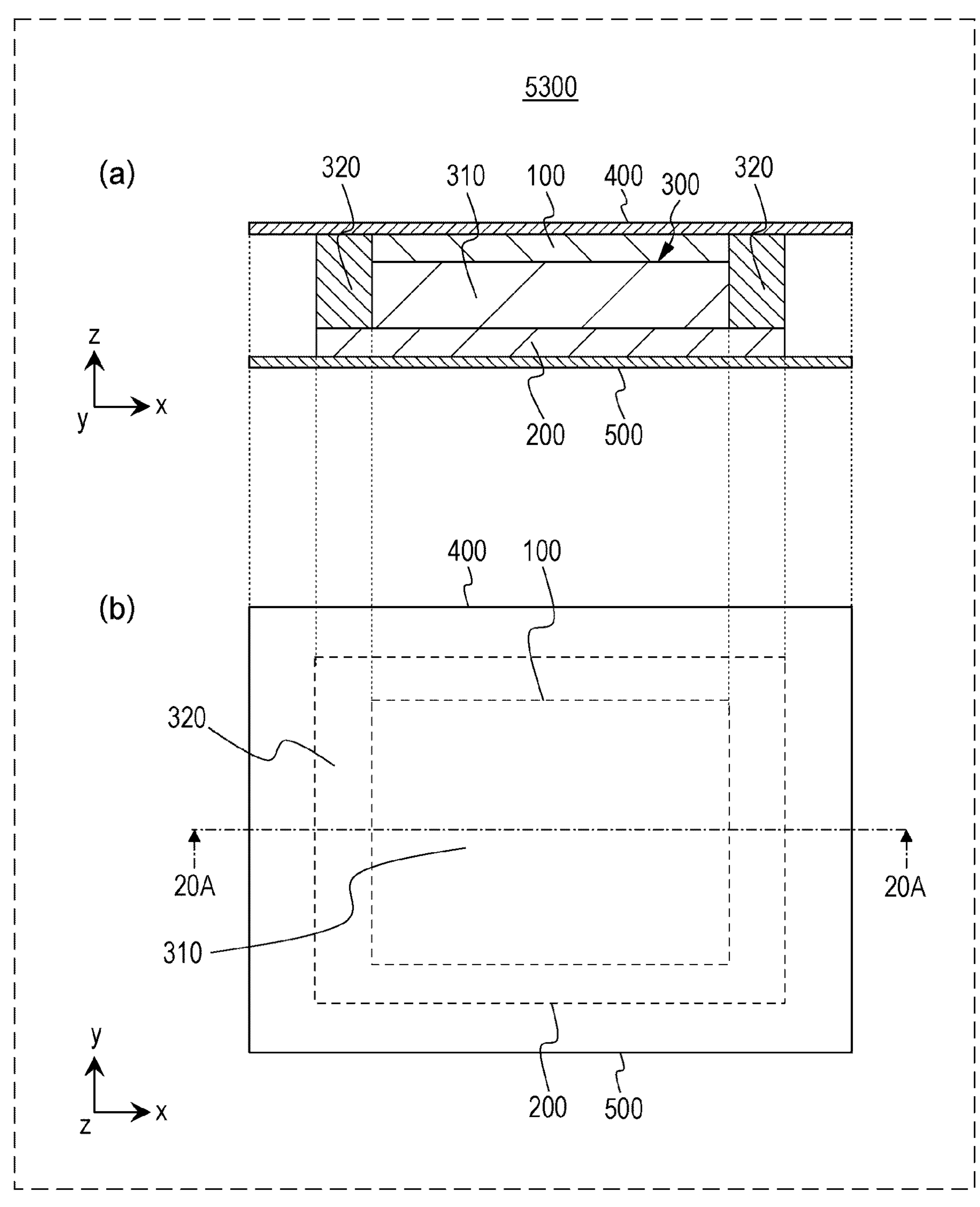
FIG. 20 illustrates a schematic structure of a battery according to the fifth embodiment.

FIG. 20 illustrates a schematic structure of a battery 5300 according to the fifth embodiment.

FIG. 20(*a*) is an x-z diagram (20A cross-sectional view) illustrating the schematic structure of the battery 5300 according to the fifth embodiment.

FIG. 20(*b*) is an x-y diagram (top perspective view) illustrating the schematic structure of the battery 5300 according to the fifth embodiment.

As illustrated in FIG. 20, the second region 320 may lie in a region where the electrode layer 100 is absent among the region facing the counter electrode layer 200 (for example, the region in which the counter electrode layer 200 and the electrode current collector 400 face each other without the electrode layer 100 therebetween). In other words, the second region 320 may be absent in the region where the electrode current collector 400 and the counter electrode current collector 500 face each other without the electrode layer 100 and the counter electrode layer 200 therebetween among the region where the electrode current collector 400 and the counter electrode current collector 500 face each other.

Sixth Embodiment

The sixth embodiment will now be described. Descriptions for the features overlapping those of the first to fifth embodiments are omitted as appropriate.

Figure 21:
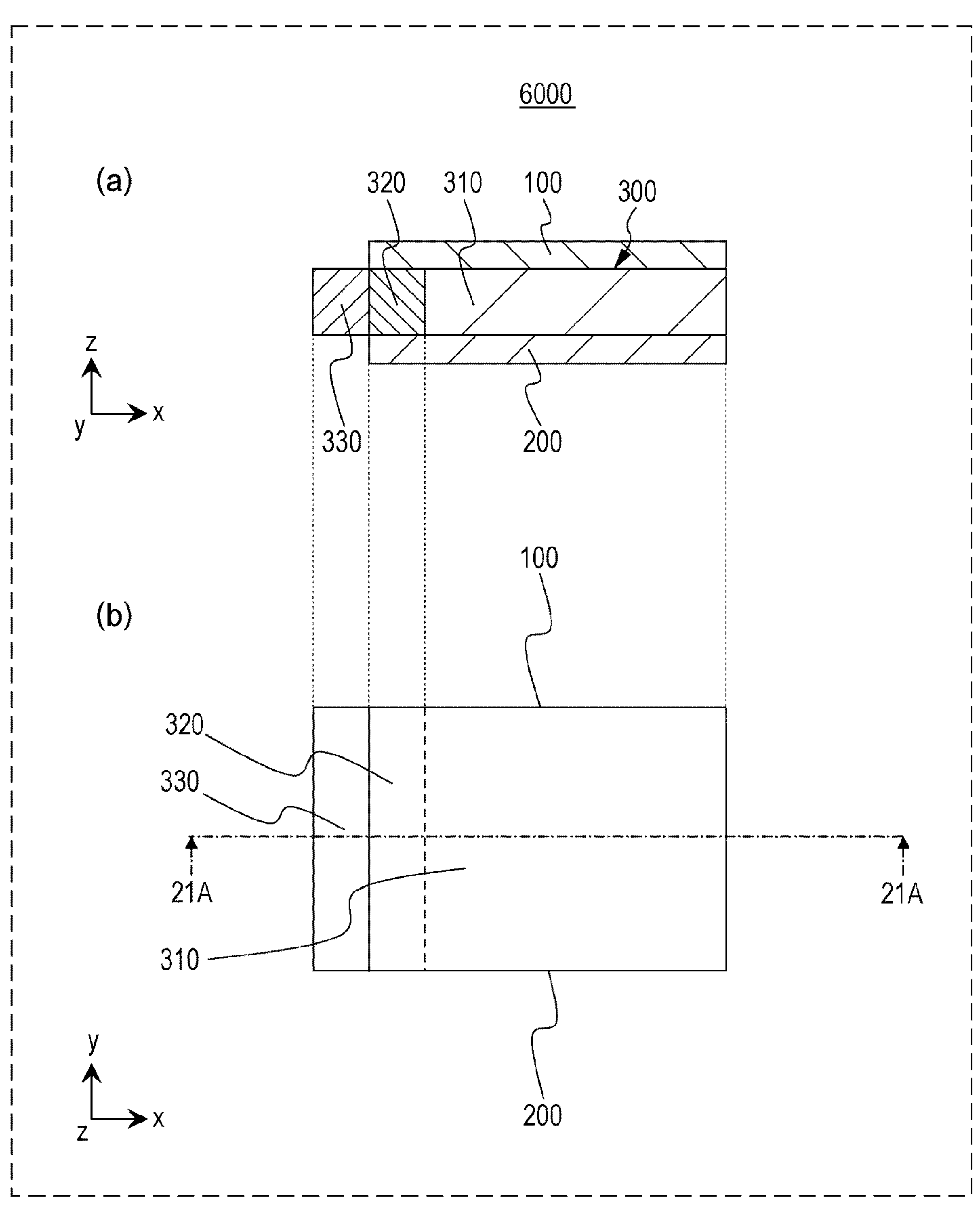
FIG. 21 illustrates a schematic structure of a battery according to a sixth embodiment.

FIG. 21 illustrates a schematic structure of a battery 6000 according to the sixth embodiment.

FIG. 21(*a*) is an x-z diagram (21A cross-sectional view) illustrating the schematic structure of the battery 6000 according to the sixth embodiment.

FIG. 21(*b*) is an x-y diagram (top perspective view) illustrating the schematic structure of the battery 6000 according to the sixth embodiment.

The battery 6000 according to the sixth embodiment further includes the following features in addition to the features of the battery 1000 of the first embodiment described above.

That is, in the battery 6000 of the sixth embodiment, the solid electrolyte layer 300 has a third region 330.

The third region 330 is a region that contains a third solid electrolyte material.

The third region 330 is in contact with the second region 320.

The second region 320 is positioned between the first region 310 and the third region 330.

The third density is higher than the second density.

Here, the third density is the density of the third solid electrolyte material in the third region 330.

According to the above-described structure, the density of the solid electrolyte material can be gradually changed across the first region 310, the second region 320, and the third region 330. In other words, the density of the solid electrolyte material can be gradually increased from the center portion of the solid electrolyte layer 300 toward the outer rim portion of the solid electrolyte layer 300. Compared to the case in which the first region 310 and the third region 330 are in direct contact, interposing the second region 320 between the first region 310 and the third region 330 decreases the difference in the density of the solid electrolyte material between adjacent and contacting regions. As a result, the physical property values (for example, a thermal expansion coefficient) of the regions in contact with each other can be adjusted to be close to each other. Thus, the matching and adhesion at the interfaces between the first region 310, the second region 320, and the third region 330 can be further improved. In other words, occurrence of structural defects that inhibit heat transfer between the first region 310, the second region 320, and the third region 330 can be further suppressed. As a result, the heat generated in the center portion of the battery (for example, heat generated in the first region 310, the electrode layer 100, or the counter electrode layer 200) can be more easily dissipated to the third region 330 and the surface of the solid electrolyte layer 300 (and the outside of the battery) through the second region 320.

Moreover, according to the above-described structure, interposing the second region 320 between the first region 310 and the third region 330 decreases the difference in the density of the solid electrolyte material between the first region 310 and the third region 330. In other words, the density of the third solid electrolyte material in the third region 330 can be sufficiently increased. In this manner, the third region 330, which has an increased solid electrolyte material density, can be placed in the outer rim portion of the solid electrolyte layer 300. Thus, the heat generated in the center portion of the battery can be more easily dissipated to the surface of the solid electrolyte layer 300 (and the outside of the battery) through the third region 330.

The electrode layer 100 may contain an electrode active material.

The counter electrode layer 200 may contain a counter electrode active material.

The density of the electrode active material and the density of the counter electrode active material in the first region 310 may both be lower than the first density.

The density of the electrode active material and the density of the counter electrode active material in the second region 320 may both be lower than the second density.

The density of the electrode active material and the density of the counter electrode active material in the third region 330 may both be lower than the third density.

According to the above-described structure, the first region 310, the second region 320, and the third region 330 can be placed in a portion where the densities of the electrode active material and the counter electrode active material are low (in other words, the portion that is remote from both the electrode layer 100 and the counter electrode layer 200 and that lies in a portion closer to the center in the solid electrolyte layer 300). That is, the first region 310, the second region 320, and the third region 330 having high heat dissipating properties can be placed in a portion closer to the center inside the battery. As a result, heat generated in the center portion of the battery can be more easily transferred to the outer rim portion of the battery compared to the structure in which a heat-dissipating member is installed in a portion closer to the electrode layer 100 (a portion closer to the counter electrode layer 200).

The first region 310, the second region 320, and the third region 330 may each be a region not containing an electrode active material or a counter electrode active material.

According to the above-described structure, the first region 310, the second region 320, and the third region 330 can be placed in a portion where the electrode active material and the counter electrode active material are not contained (in other words, the portion that is remote from both the electrode layer 100 and the counter electrode layer 200 and that lies in a portion closer to the center in the solid electrolyte layer 300). That is, the first region 310, the second region 320, and the third region 330 having high heat dissipating properties can be placed in a portion closer to the center inside the battery. As a result, heat generated in the center portion of the battery can be more easily transferred to the outer rim portion of the battery compared to the structure in which a heat-dissipating member is installed in a portion closer to the electrode layer 100 (a portion closer to the counter electrode layer 200).

Examples of the third solid electrolyte material include the solid electrolytes that can be used as the first solid electrolyte material described above.

The first solid electrolyte material, the second solid electrolyte material, and the third solid electrolyte material may be materials different from each other. In this manner, for example, while a solid electrolyte material having a high heat dissipating property is used as the second solid electrolyte material and the third solid electrolyte material, a solid electrolyte material having high metal ion conductivity can be used as the first solid electrolyte material.

Alternatively, the first solid electrolyte material, the second solid electrolyte material, and the third solid electrolyte material may be the same material.

According to the above-described structure, the same solid electrolyte material can be contained in the first region 310, the second region 320, and the third region 330. As a result, the physical property values (for example, a thermal expansion coefficient) of the first region 310, the second region 320, and the third region 330 can be adjusted to be close to each other. Thus, the matching and adhesion at the interfaces between the first region 310, the second region 320, and the third region 330 can be further improved. In other words, occurrence of structural defects that inhibit heat transfer between the first region 310, the second region 320, and the third region 330 can be further suppressed. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery) through the second region 320 and the third region 330. Furthermore, for example, when the first region 310, the second region 320, and the third region 330 are composed of the same material, the battery production process (for example, mixing of the mixture and application of the mixture, etc.) can be further simplified.

The third solid electrolyte material may be constituted by particles. In such a case, the third region 330 is a region that contains particles of the third solid electrolyte material. Here, the third density is the density of the particles of the third solid electrolyte material in the third region 330.

As illustrated in FIG. 21, the third region 330 may be positioned only outside the region where the electrode layer 100 and the counter electrode layer 200 face each other. Alternatively, the third region 330 may be positioned within the region where the electrode layer 100 and the counter electrode layer 200 face each other and also outside the region where the electrode layer 100 and the counter electrode layer 200 face each other. In this manner, the third region 330 can be placed to be more remote from the center portion of the battery. Thus, the heat dissipating property by the third region 330 can be further enhanced.

Alternatively, the third region 330 may be positioned only within the region where the electrode layer 100 and the counter electrode layer 200 face each other.

As illustrated in FIG. 21, the third region 330 may be in contact with only one end portion of the second region 320. For example, when the second region 320 has a rectangular shape (for example, a quadrilateral shape) as illustrated in FIG. 21, the third region 330 may be disposed to be in contact with only one side of this shape.

Alternatively, the third region 330 may be in contact with two or more end portions among the end portions of the second region 320. For example, when the second region 320 has a rectangular shape (for example, a quadrilateral shape) as illustrated in FIG. 21, the third region 330 may be disposed to be in contact with two or more sides of this shape. In this manner, the heat dissipating property (and strength, environmental resistance, etc.) can be enhanced at the two or more end portions.

Figure 22:
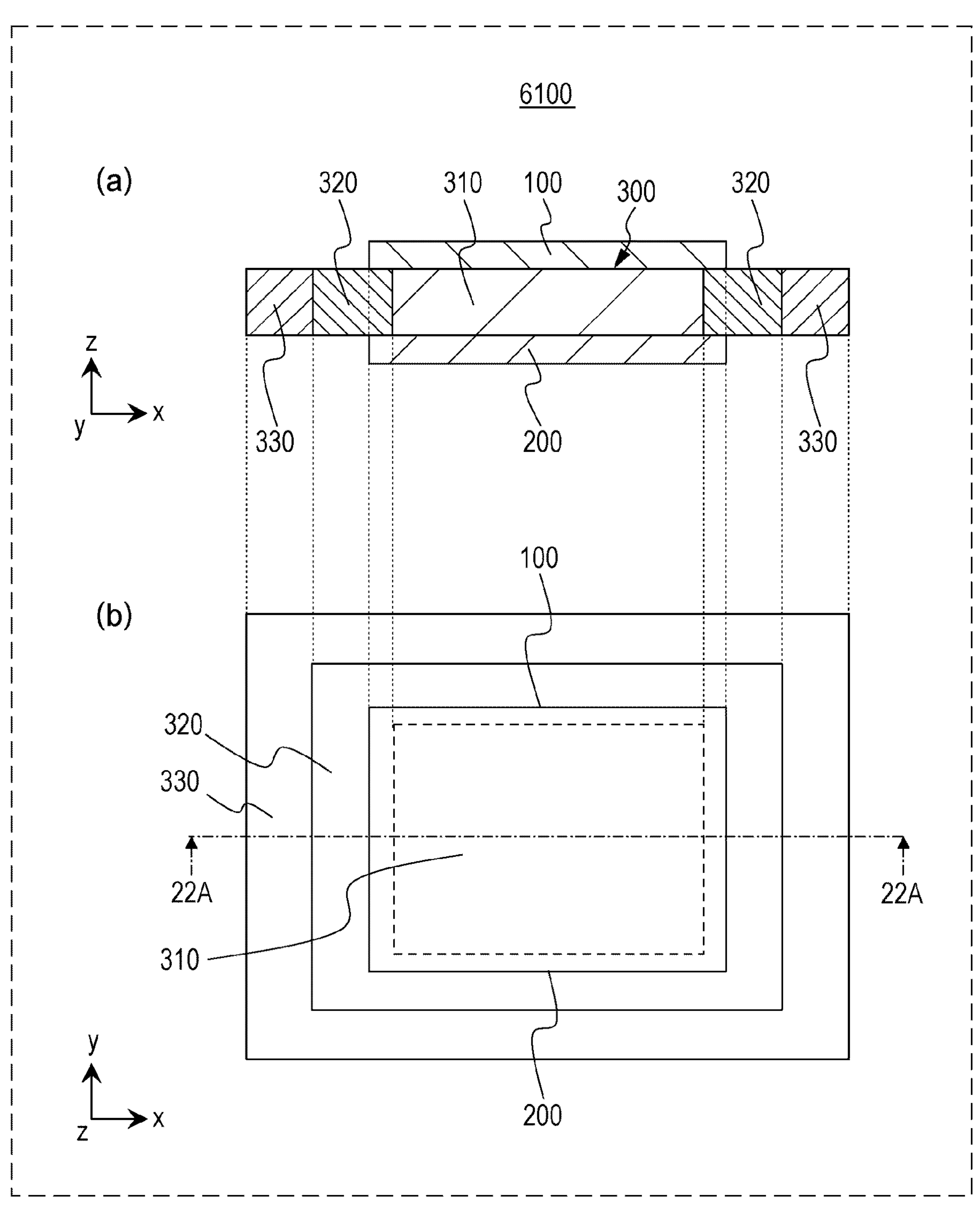
FIG. 22 illustrates a schematic structure of a battery according to the sixth embodiment.

FIG. 22 illustrates a schematic structure of a battery 6100 according to the sixth embodiment.

FIG. 22(*a*) is an x-z diagram (22A cross-sectional view) illustrating the schematic structure of the battery 6100 according to the sixth embodiment.

FIG. 22(*b*) is an x-y diagram (top perspective view) illustrating the schematic structure of the battery 6100 according to the sixth embodiment.

As illustrated in FIG. 22, the third region 330 may surround the second region 320.

According to this structure, the density of the solid electrolyte material can be gradually increased from the center portion of the solid electrolyte layer 300 toward the outer rim portion (for example, the entire outer rim portion) on the four sides of the solid electrolyte layer 300. In other words, the matching and adhesion at the interfaces between contacting portions of the first region 310, the second region 320, and the third region 330 can be further improved in the outer rim portion (for example, the entire outer rim portion) on the four sides of the solid electrolyte layer 300. As a result, the heat generated in the center portion of the battery (for example, heat generated in the first region 310, the electrode layer 100, or the counter electrode layer 200) can be more easily dissipated to the third region 330 and the surface of the outer rim portion on the four sides of the solid electrolyte layer 300 (and the outside of the battery) through the second region 320.

In the present disclosure, "the third region 330 surrounds the second region 320" encompasses, for example, "the third region 330 contacts all of the end portions of the second region 320". In other words, for example, when the second region 320 has a rectangular outline shape (for example, a quadrilateral shape) as illustrated in FIG. 22, the third region 330 may be in contact with all of the sides of this shape. For example, the outer peripheral side surface of the second region 320 may be bonded to the inner peripheral side surface of the third region 330.

Figure 23:
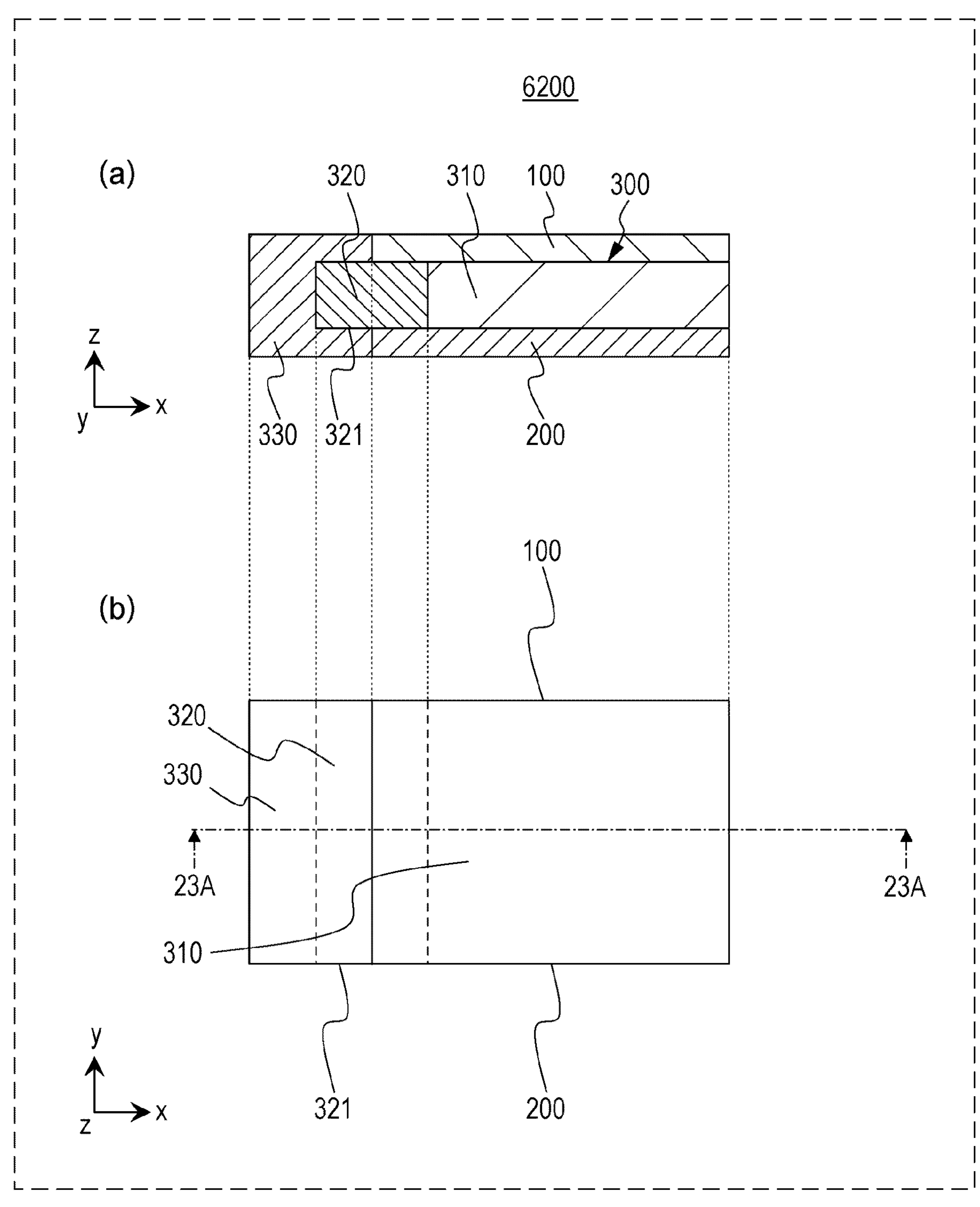
FIG. 23 illustrates a schematic structure of a battery according to the sixth embodiment.

FIG. 23 illustrates a schematic structure of a battery 6200 according to the sixth embodiment.

FIG. 23(*a*) is an x-z diagram (23A cross-sectional view) illustrating the schematic structure of the battery 6200 according to the sixth embodiment.

FIG. 23(*b*) is an x-y diagram (top perspective view) illustrating the schematic structure of the battery 6200 according to the sixth embodiment.

As illustrated in FIG. 23, the second region 320 may have a second projecting portion 321.

The second projecting portion 321 is a portion that projects outward from the region where the electrode layer 100 and the counter electrode layer 200 face each other.

Here, the third region 330 may cover the second projecting portion 321.

According to the above-described structure, the contact area between the second region 320 and the third region 330 can be further increased. Thus, the heat from the center portion of the solid electrolyte layer 300 is easily transferred (dissipated) to the outer rim portion of the solid electrolyte layer 300. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

Figure 24:
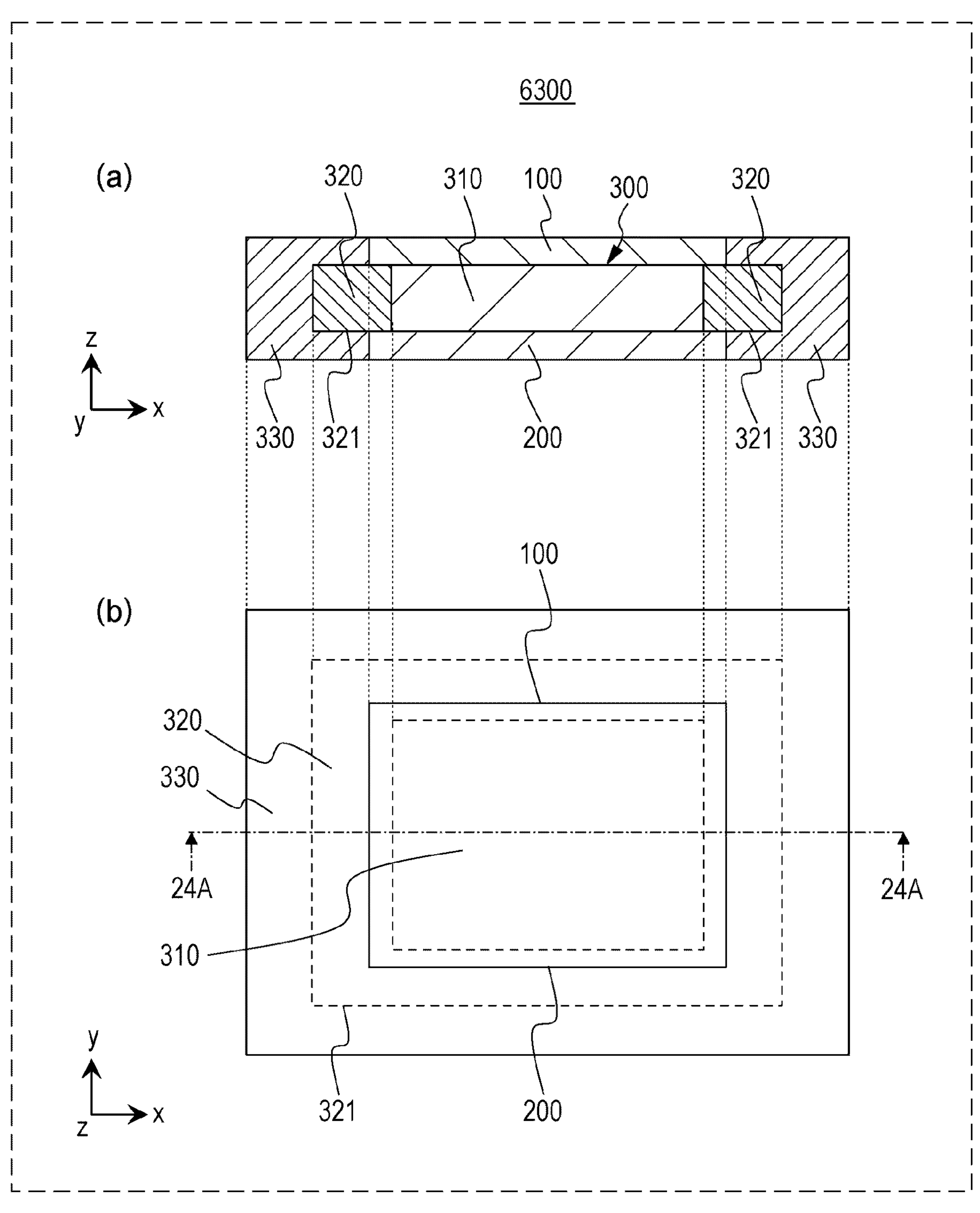
FIG. 24 illustrates a schematic structure of a battery according to the sixth embodiment.

FIG. 24 illustrates a schematic structure of a battery 6300 according to the sixth embodiment.

FIG. 24(*a*) is an x-z diagram (24A cross-sectional view) illustrating the schematic structure of the battery 6300 according to the sixth embodiment.

FIG. 24(*b*) is an x-y diagram (top perspective view) illustrating the schematic structure of the battery 6300 according to the sixth embodiment.

As illustrated in FIG. 24, the second projecting portion 321 may surround the region where the electrode layer 100 and the counter electrode layer 200 face each other.

Here, the third region 330 may cover the second projecting portion 321 exposing from around the region where the electrode layer 100 and the counter electrode layer 200 face each other.

According to the above-described structure, the contact area between the second region 320 and the third region 330 can be further increased. In this manner, the heat from the center portion of the solid electrolyte layer 300 is easily transferred (dissipated) to the outer rim portion of the solid electrolyte layer 300 close to the parts where heat has been generated. As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

Figure 25:
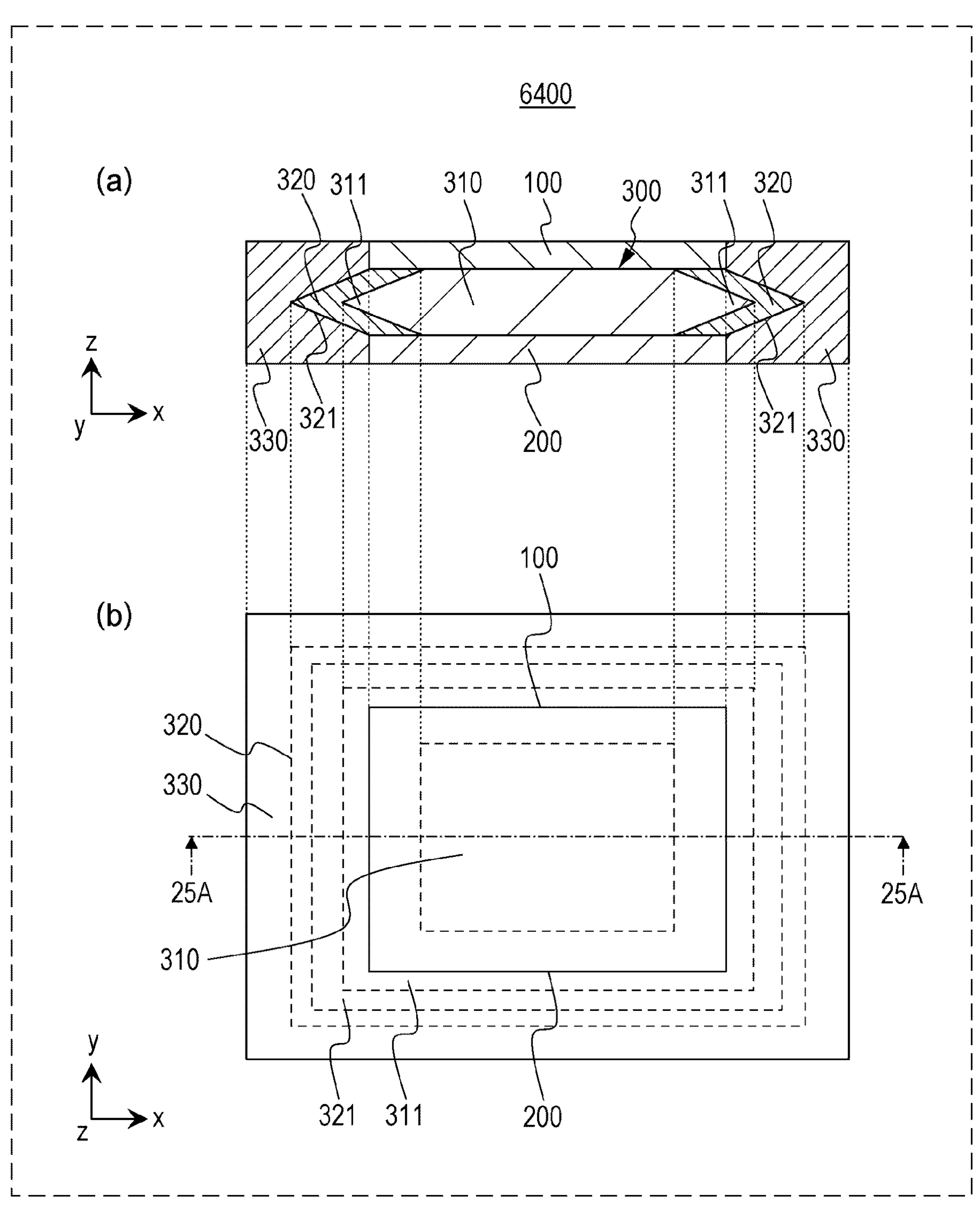
FIG. 25 illustrates a schematic structure of a battery according to the sixth embodiment.

FIG. 25 illustrates a schematic structure of a battery 6400 according to the sixth embodiment.

FIG. 25(*a*) is an x-z diagram (25A cross-sectional view) illustrating the schematic structure of the battery 6400 according to the sixth embodiment.

FIG. 25(*b*) is an x-y diagram (top perspective view) illustrating the schematic structure of the battery 6400 according to the sixth embodiment.

As illustrated in FIG. 25, the first region 310 may have a first projecting portion 311.

The first projecting portion 311 is a portion that projects outward from the region where the electrode layer 100 and the counter electrode layer 200 face each other.

Here, the second region 320 may cover the first projecting portion 311.

The second region 320 covering the first projecting portion 311 may have a second projecting portion 321.

The second projecting portion 321 is a portion that projects outward from the region where the electrode layer 100 and the counter electrode layer 200 face each other.

Here, the third region 330 may cover the second projecting portion 321.

According to the above-described structure, the contact area between the first region 310 and the second region 320 and the contact area between the second region 320 and the third region 330 can both be further increased. Thus, the heat from the center portion of the solid electrolyte layer 300 is easily transferred (dissipated) to the outer rim portion of the solid electrolyte layer 300.

As a result, the heat generated in the center portion of the battery (for example, heat generated in the first region 310, the electrode layer 100, or the counter electrode layer 200) can be more easily dissipated to the surface of the solid electrolyte layer 300 (and the outside of the battery).

The third region 330 may be in contact with an end portion (for example, a side surface) of the electrode layer 100.

According to the above-described structure, the third region 330, which has a high solid electrolyte material density, can be disposed to be in contact with the outer rim portion (for example, at least one end portion) of the electrode layer 100. As a result, the heat from the electrode layer 100 is easily transferred (dissipated) to the third region

330. As a result, the heat generated in the center portion of the battery (in other words, heat generated in the electrode layer 100) can be more easily dissipated to the surface of the solid electrolyte layer 300 (and the outside of the battery).

According to the above-described structure, the outer rim portion (for example, at least one end portion) of the electrode layer 100 can be covered with the third region 330 having a higher strength. Thus, breaking of the outer rim portion of the electrode layer 100, which has a relatively low strength (for example, collapse of the electrode material), can be suppressed by the third region 330. Thus, the strength of the battery can be further improved.

According to the above-described structure, the third region 330 having a higher solid electrolyte material density can be interposed between the outer rim portion of the electrode layer 100 and the outside of the battery (for example, outside air). As a result, for example, the outside air (for example, atmospheric air, humid air, or the like) coming into the outer rim portion of the electrode layer 100 can be blocked by the third region 330. Thus, the environmental resistance of the battery can be further improved.

The third region 330 may be in contact with only one end portion of the electrode layer 100. For example, when the electrode layer 100 has a rectangular shape (for example, a quadrilateral shape), the third region 330 may be disposed to be in contact with only one side of this shape.

Alternatively, the third region 330 may be in contact with two or more end portions among the end portions of the electrode layer 100. For example, when the electrode layer 100 has a rectangular shape (for example, a quadrilateral shape), the third region 330 may be disposed to be in contact with two or more sides of this shape. In this manner, the heat dissipating property (and strength, environmental resistance, etc.) can be enhanced at the two or more end portions.

Alternatively, the third region 330 may surround the electrode layer 100.

According to the above-described structure, the third region 330, which has a high solid electrolyte material density, can be disposed to be in contact with the outer rim portion on the four sides (for example, the entire outer rim portion) of the electrode layer 100. As a result, the heat from the electrode layer 100 is easily transferred (dissipated) to the third region 330 close to the parts where heat has been generated. As a result, the heat generated in the center portion of the battery (in other words, heat generated in the electrode layer 100) can be more easily dissipated to the surface of the solid electrolyte layer 300 (and the outside of the battery).

According to the above-described structure, the outer rim portion on the four sides (for example, the entire outer rim) of the electrode layer 100 can be covered with the third region 330 having a higher strength. Thus, breaking of the outer rim portion of the electrode layer 100, which has a relatively low strength (for example, collapse of the electrode material), can be suppressed by the third region 330. Thus, the strength of the battery can be further improved.

According to the above-described structure, the third region 330 having a higher solid electrolyte material density can be interposed between the outer rim portion on the four sides of the electrode layer 100 and the outside of the battery (for example, outside air). As a result, for example, the outside air (for example, atmospheric air, humid air, or the like) coming into the outer rim portion on the four sides of the electrode layer 100 can be blocked by the third region 330. Thus, the environmental resistance of the battery can be further improved.

The third region 330 may be in contact with an end portion (for example, a side surface) of the counter electrode layer 200.

According to the above-described structure, the third region 330, which has a high solid electrolyte material density, can be disposed to be in contact with the outer rim portion (for example, at least one end portion) of the counter electrode layer 200. As a result, the heat from the counter electrode layer 200 is easily transferred (dissipated) to the third region 330. As a result, the heat generated in the center portion of the battery (in other words, heat generated in the counter electrode layer 200) can be more easily dissipated to the surface of the solid electrolyte layer 300 (and the outside of the battery).

According to the above-described structure, the outer rim portion (for example, at least one end portion) of the counter electrode layer 200 can be covered with the third region 330 having a higher strength. Thus, breaking of the outer rim portion of the counter electrode layer 200, which has a relatively low strength (for example, collapse of the counter electrode material), can be further suppressed by the third region 330. Thus, the strength of the battery can be further improved.

According to the above-described structure, the third region 330 having a higher solid electrolyte material density can be interposed between the outer rim portion of the counter electrode layer 200 and the outside of the battery (for example, outside air). As a result, for example, the outside air (for example, atmospheric air, humid air, or the like) coming into the outer rim portion of the counter electrode layer 200 can be blocked by the third region 330. Thus, the environmental resistance of the battery can be further improved.

The third region 330 may be in contact with only one end portion of the counter electrode layer 200. For example, when the counter electrode layer 200 has a rectangular shape (for example, a quadrilateral shape), the third region 330 may be disposed to be in contact with only one side of this shape.

Alternatively, the third region 330 may be in contact with two or more end portions among the end portions of the counter electrode layer 200. For example, when the counter electrode layer 200 has a rectangular shape (for example, a quadrilateral shape), the third region 330 may be disposed to be in contact with two or more sides of this shape. In this manner, the heat dissipating property (and strength, environmental resistance, etc.) can be enhanced at the two or more end portions.

Alternatively, the third region 330 may surround the counter electrode layer 200.

According to the above-described structure, the third region 330, which has a high solid electrolyte material density, can be disposed to be in contact with the outer rim portion on the four sides (for example, the entire outer rim portion) of the counter electrode layer 200. As a result, the heat from the counter electrode layer 200 is easily transferred (dissipated) to the third region 330 close to the parts where heat has been generated. As a result, the heat generated in the center portion of the battery (in other words, heat generated in the counter electrode layer 200) can be more easily dissipated to the surface of the solid electrolyte layer 300 (and the outside of the battery).

According to the above-described structure, the outer rim portion on the four sides (for example, the entire outer rim) of the counter electrode layer 200 can be covered with the third region 330 having a higher strength. Thus, breaking of the outer rim portion on the four sides of the counter electrode layer 200, which has a relatively low strength (for example, collapse of the counter electrode material), can be further suppressed by the third region 330. Thus, the strength of the battery can be further improved.

According to the above-described structure, the third region 330 having a higher solid electrolyte material density can be interposed between the outer rim portion on the four sides of the counter electrode layer 200 and the outside of the battery (for example, outside air). As a result, for example, the outside air (for example, atmospheric air, humid air, or the like) coming into the outer rim portion on the four sides of the counter electrode layer 200 can be blocked by the third region 330. Thus, the environmental resistance of the battery can be further improved.

In the present disclosure, "the third region 330 surrounds the electrode layer 100 (or the counter electrode layer 200)" encompasses, for example, "the third region 330 contacts all of the end portions of the electrode layer 100 (or the counter electrode layer 200)". In other words, for example, when the electrode layer 100 (or the counter electrode layer 200) has a rectangular shape (for example, a quadrilateral shape), the third region 330 may be in contact with all of the sides of this shape.

Figure 26:
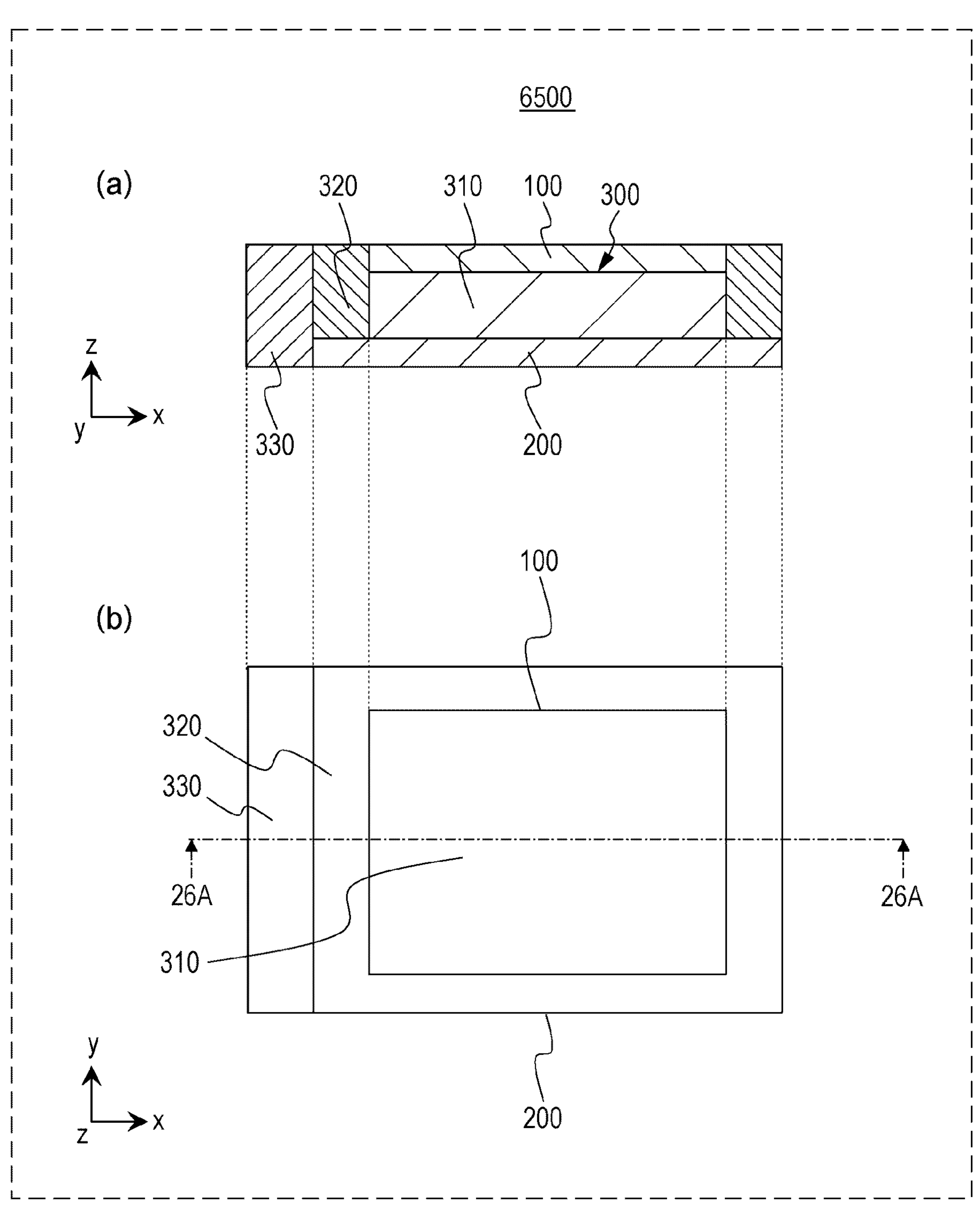
FIG. 26 illustrates a schematic structure of a battery according to the sixth embodiment.

FIG. 26 illustrates a schematic structure of a battery 6500 according to the sixth embodiment.

FIG. 26(*a*) is an x-z diagram (26A cross-sectional view) illustrating the schematic structure of the battery 6500 according to the sixth embodiment.

FIG. 26(*b*) is an x-y diagram (top perspective view) illustrating the schematic structure of the battery 6500 according to the sixth embodiment.

As illustrated in FIG. 26, a range in which the counter electrode layer 200 is formed may be larger than the range in which the electrode layer 100 is formed.

Here, the electrode layer 100 may be positioned within the range in which the counter electrode layer 200 is formed.

The second region 320 may be in contact with an end portion of the electrode layer 100.

The third region 330 may be in contact with an end portion of the counter electrode layer 200.

According to the above-described structure, since the counter electrode layer 200 is formed to have a larger area than the electrode layer 100, precipitation of metal (for example, lithium) in the counter electrode layer 200 can be suppressed. Thus, short-circuiting between the electrode layer 100 and the counter electrode layer 200 caused by metal precipitation can be prevented.

According to the above-described structure, the third region 330, which has a high solid electrolyte material density, can be disposed to be in contact with the outer rim portion (for example, at least one end portion) of the counter electrode layer 200 while the counter electrode layer 200 is formed to have a larger area than the electrode layer 100 (in other words, while reducing the risk of short-circuiting due to the metal precipitation).

According to the above-described structure, the second region 320, which has a high solid electrolyte material density, can be disposed to be in contact with the outer rim portion (for example, at least one end portion) of the electrode layer 100 while the counter electrode layer 200 is formed to have a larger area than the electrode layer 100 (in other words, while reducing the risk of short-circuiting due to the metal precipitation).

Figure 27:
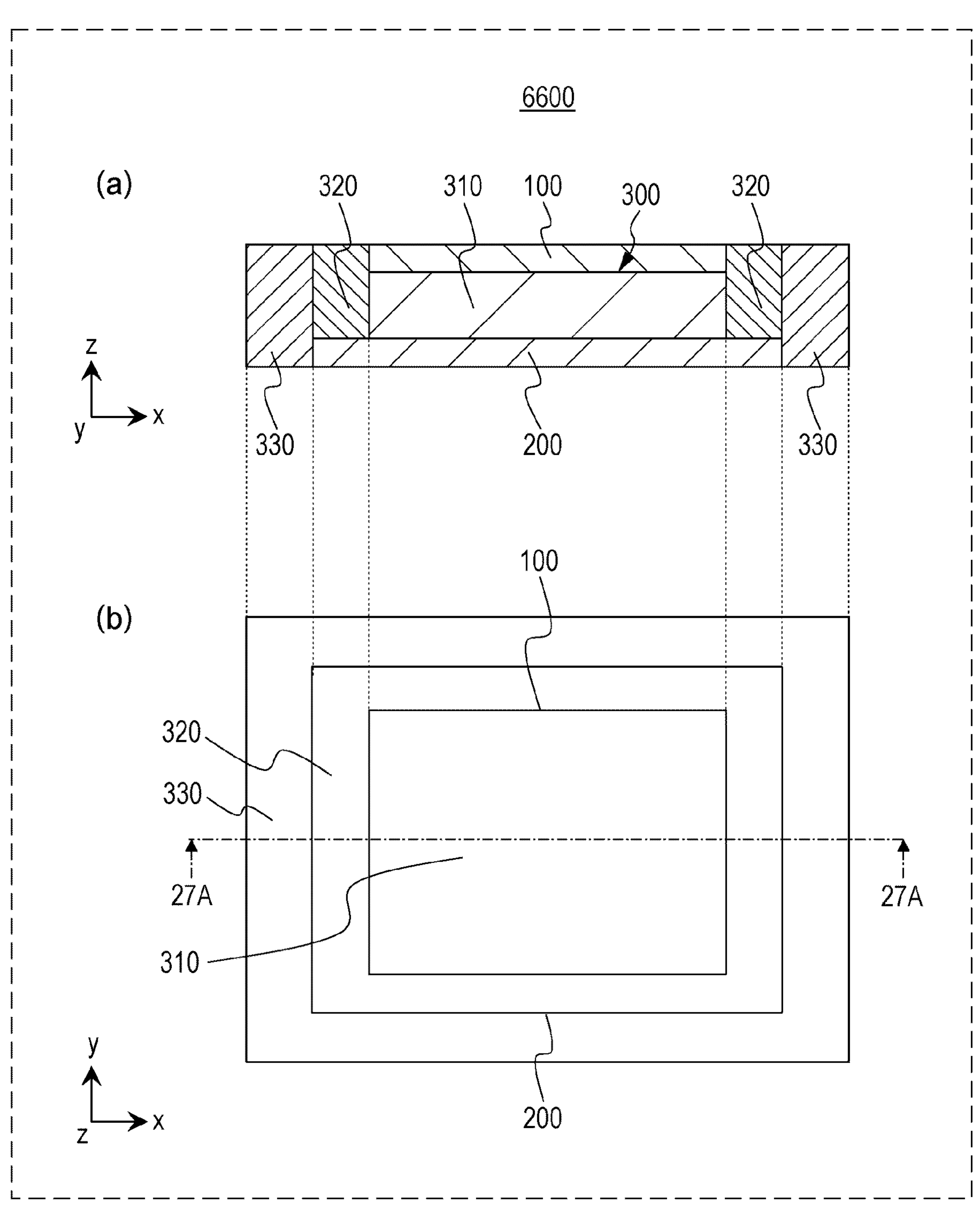
FIG. 27 illustrates a schematic structure of a battery according to the sixth embodiment.

FIG. 27 illustrates a schematic structure of a battery 6600 according to the sixth embodiment.

FIG. 27(*a*) is an x-z diagram (27A cross-sectional view) illustrating the schematic structure of the battery 6600 according to the sixth embodiment.

FIG. 27(*b*) is an x-y diagram (top perspective view) illustrating the schematic structure of the battery 6600 according to the sixth embodiment.

As illustrated in FIG. 27, the second region 320 may surround the electrode layer 100.

Here, the third region 330 may surround the counter electrode layer 200.

According to the above-described structure, the third region 330, which has a high solid electrolyte material density, can be disposed to be in contact with the outer rim portion on the four sides (for example, the entire outer rim portion) of the counter electrode layer 200 while the counter electrode layer 200 is formed to have a larger area than the electrode layer 100 (in other words, while reducing the risk of short-circuiting due to the metal precipitation).

According to the above-described structure, the second region 320, which has a high solid electrolyte material density, can be disposed to be in contact with the outer rim portion on the four sides (for example, the entire outer rim portion) of the electrode layer 100 while the counter electrode layer 200 is formed to have a larger area than the electrode layer 100 (in other words, while reducing the risk of short-circuiting due to the metal precipitation).

Figure 28:
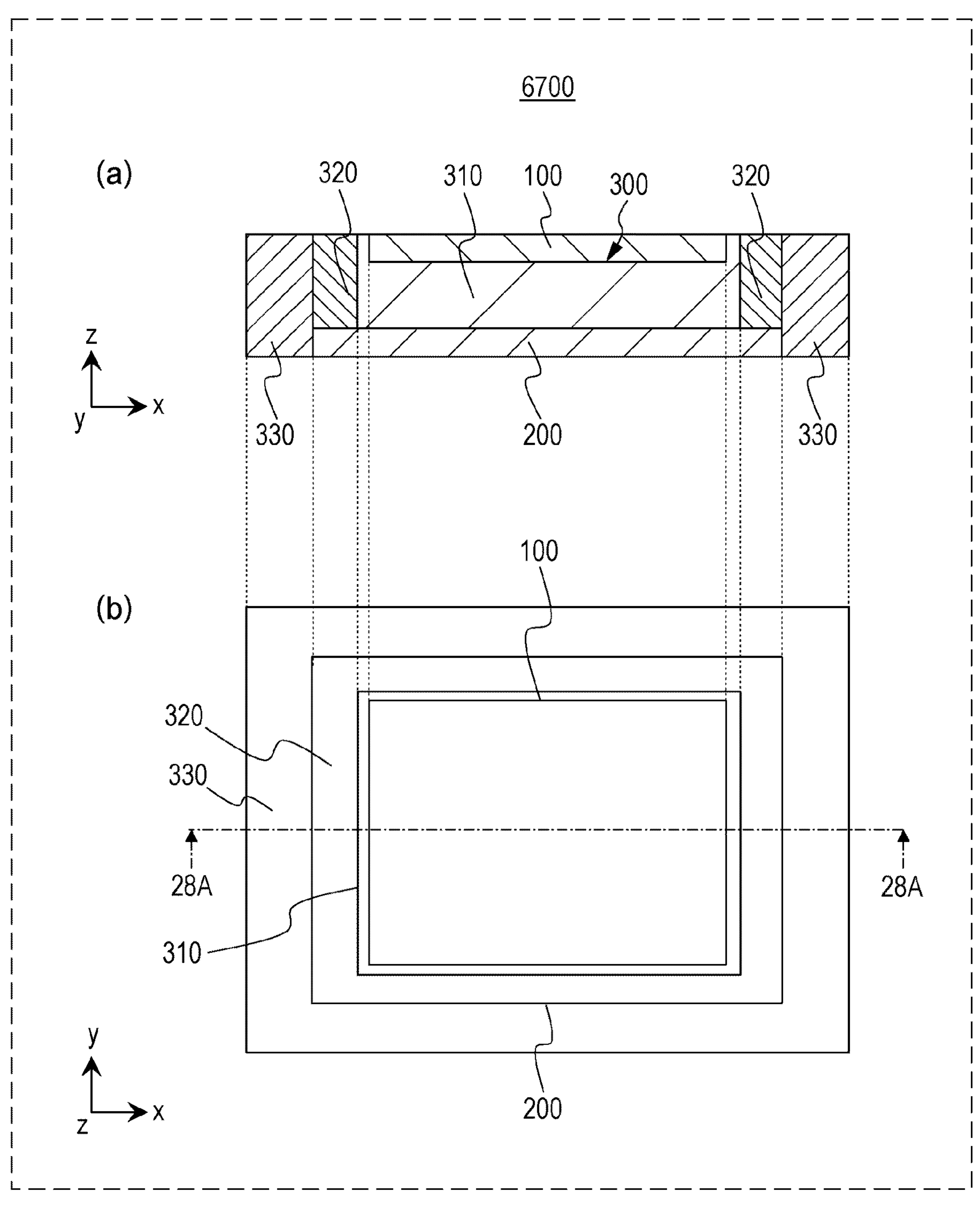
FIG. 28 illustrates a schematic structure of a battery according to the sixth embodiment.

FIG. 28 illustrates a schematic structure of a battery 6700 according to the sixth embodiment.

FIG. 28(*a*) is an x-z diagram (28A cross-sectional view) illustrating the schematic structure of the battery 6700 according to the sixth embodiment.

FIG. 28(*b*) is an x-y diagram (top perspective view) illustrating the schematic structure of the battery 6700 according to the sixth embodiment.

As illustrated in FIG. 28, the first region 310 may surround the electrode layer 100. In other words, the second region 320 need not be in contact with the electrode layer 100. In this manner, the area of the first region 310 positioned within the region where the electrode layer 100 and the counter electrode layer 200 face each other can be further increased. In other words, the area of the first region 310, which has a function of transferring metal ions, between the electrode layer 100 and the counter electrode layer 200 can be further increased. In this manner, precipitation of the metal (for example, lithium) in the counter electrode layer 200 can be further suppressed.

Seventh Embodiment

The seventh embodiment will now be described. Descriptions for the features overlapping those of the first to sixth embodiments are omitted as appropriate.

Figure 29:
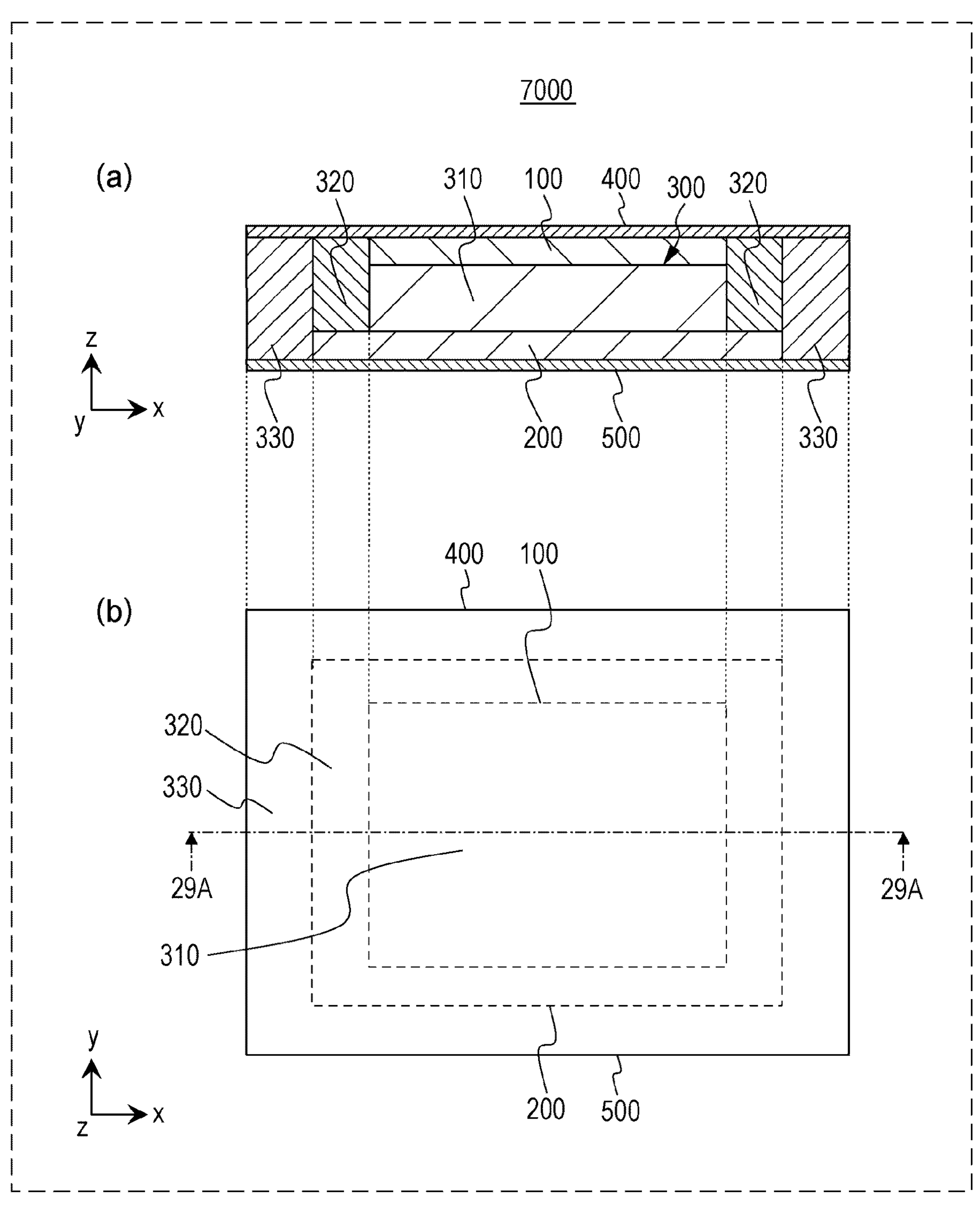
FIG. 29 illustrates a schematic structure of a battery according to a seventh embodiment.

FIG. 29 illustrates a schematic structure of a battery 7000 according to the seventh embodiment.

FIG. 29(*a*) is an x-z diagram (29A cross-sectional view) illustrating the schematic structure of the battery 7000 according to the seventh embodiment.

FIG. 29(*b*) is an x-y diagram (top perspective view) illustrating the schematic structure of the battery 7000 according to the seventh embodiment.

The battery 7000 according to the seventh embodiment further includes the following features in addition to the features of the battery 6000 of the sixth embodiment described above.

That is, the battery 7000 of the seventh embodiment further includes an electrode current collector 400 and a counter electrode current collector 500.

The electrode current collector 400 is a current collector electrically coupled to the electrode layer 100.

The counter electrode current collector 500 is a current collector electrically coupled to the counter electrode layer 200.

The third region 330 is positioned between the electrode current collector 400 and the counter electrode current collector 500 and is in contact with the electrode current collector 400 and the counter electrode current collector 500.

According to the above-described structure, short-circuiting caused by contact between the electrode current collector 400 and the counter electrode current collector 500 can be suppressed. In other words, the third region 330, which has a high solid electrolyte material density (in other words, a high strength), can function as a high-strength skeleton structure in the outer rim portion of the solid electrolyte layer 300 (in other words, the outer rim portion of the electrode current collector 400 and the counter electrode current collector 500). As a result, the third region 330 suppresses deformation or structural defects in the outer rim portion of the electrode current collector 400 and the counter electrode current collector 500. Thus, for example, when the battery has a large area and a reduced layer thickness (for example, a battery designed as a high-output, high-capacity battery) or when the battery is an all-solid battery not equipped with separators, short-circuiting caused by contact between the electrode current collector 400 and the counter electrode current collector 500 can be suppressed by the third region 330. Thus, the deformation resistance and impact resistance of the battery can be further enhanced.

The third region 330 may be positioned within the region where the electrode current collector 400 and the counter electrode current collector 500 face each other without the electrode layer 100 and the counter electrode layer 200 therebetween among the region where the electrode current collector 400 and the counter electrode current collector 500 face each other.

The third region 330 may be positioned at only one end portion of the electrode current collector 400 (and the counter electrode current collector 500). For example, when the electrode current collector 400 (and the counter electrode current collector 500) has a rectangular shape (for example, a quadrilateral shape), the third region 330 may be disposed at only one side of this shape.

Alternatively, the third region 330 may be positioned at two or more end portions among the end portions of the electrode current collector 400 (and the counter electrode current collector 500). For example, when the electrode current collector 400 (and the counter electrode current collector 500) has a rectangular shape (for example, a quadrilateral shape), the third region 330 may be disposed at two or more sides of this shape. In this manner, short-circuiting caused by contact between the electrode current collector 400 and the counter electrode current collector 500 can be suppressed at two or more end portions.

Alternatively, the third region 330 may surround the second region 320, the electrode layer 100, and the counter electrode layer 200. Here, the third region 330 surrounding the second region 320, the electrode layer 100, and the counter electrode layer 200 may be in contact with the electrode current collector 400 and the counter electrode current collector 500. In this manner, short-circuiting caused by contact between the electrode current collector 400 and the counter electrode current collector 500 can be further suppressed around (for example, on the four sides of) the multilayer body constituted by the second region 320, the electrode layer 100, and the counter electrode layer 200.

The third region 330 may be positioned within the entire region where the electrode current collector 400 and the counter electrode current collector 500 face each other without the electrode layer 100 and the counter electrode layer 200 therebetween among the region where the electrode current collector 400 and the counter electrode current collector 500 face each other. In this manner, short-circuiting caused by contact between the electrode current collector 400 and the counter electrode current collector 500 can be further suppressed around (for example, on the four sides of) the multilayer body constituted by the second region 320, the electrode layer 100, and the counter electrode layer 200.

Figure 30:
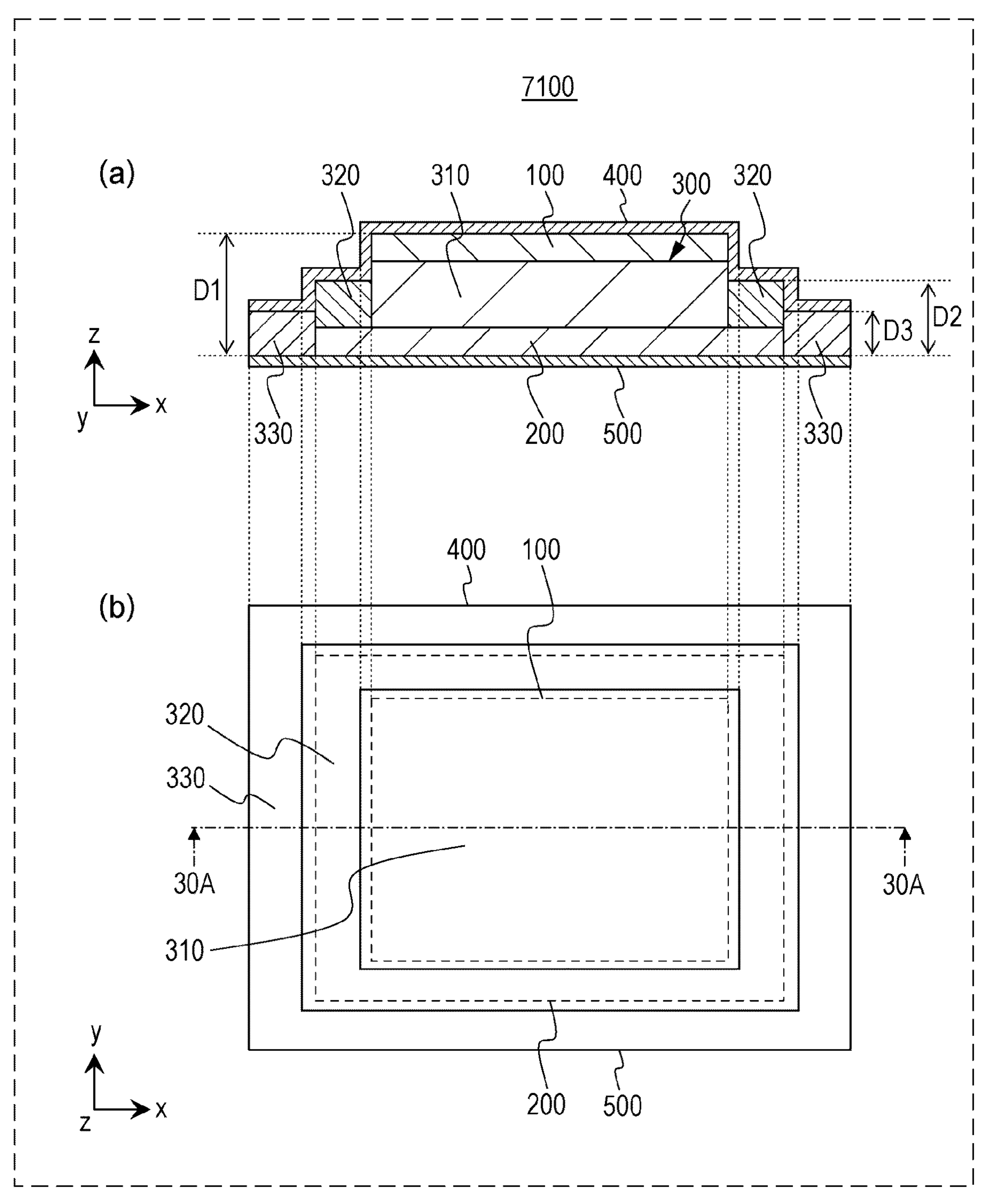
FIG. 30 illustrates a schematic structure of a battery according to the seventh embodiment.

FIG. 30 illustrates a schematic structure of a battery 7100 according to the seventh embodiment.

FIG. 30(*a*) is an x-z diagram (30A cross-sectional view) illustrating the schematic structure of the battery 7100 according to the seventh embodiment.

FIG. 30(*b*) is an x-y diagram (top perspective view) illustrating the schematic structure of the battery 7100 according to the seventh embodiment.

As illustrated in FIG. 30, the second distance D2 may be smaller than the first distance D1.

Here, the third distance D3 may be smaller than the second distance D2.

The first distance D1 is the distance between the electrode current collector 400 and the counter electrode current collector 500 at a position in which the first region 310 lies.

The second distance D2 is the distance between the electrode current collector 400 and the counter electrode current collector 500 at a position in which the second region 320 lies.

The third distance D3 is the distance between the electrode current collector 400 and the counter electrode current collector 500 at a position in which the third region 330 lies.

According to the above-described structure, a battery in which the outer rim portion of the solid electrolyte layer 300 (in other words, the outer rim portion of the electrode current collector 400 and the counter electrode current collector 500) is narrowed (in other words, a battery with narrowed outer peripheral side surfaces) can be configurated. Thus, the area of the exposed outer rim portion of the solid electrolyte layer 300 can be decreased. Thus, for example, the outside air (for example, atmospheric air, humid air, or the like) coming into the first region 310 can be more reliably blocked by the second region 320 and the third region 330. Moreover, the durability (for example, the impact resistance) of the outer peripheral side surfaces of the battery can be further improved. Thus, the environmental resistance of the battery can be further improved.

In the first to seventh embodiments, a portion (or the entirety) of side surfaces of the battery may be covered with an insulating material (for example, a sealing material). In this manner, the battery can be more firmly sealed. Here, the sealing material may be, for example, a moisture-proof laminate sheet. In this manner, the sealing material can prevent deterioration of the battery by moisture. The battery may be enclosed in a sealed case. Examples of the sealed case that can be used include common known battery cases (for example, laminate bags, metal cans, resin cases, etc.).

The batteries of the first to seventh embodiments may each further include a pair of external electrodes. The pair of external electrodes may protrude outward from the upper and lower surfaces (or side surfaces) of the battery if the entire battery is to be sealed in with the sealing material. One of the external electrodes may be coupled to the current collector (for example, the electrode current collector 400) at one end of the battery. Here, the other one of the external electrodes may be coupled to the current collector (for example, the counter electrode current collector 500) at the other end of the battery. In this manner, power can be discharged to the load coupled to the pair of external electrodes, and the battery can be charged by using a charger connected to the pair of external electrodes.

The features described in the first to seventh embodiments described above may be appropriately combined.

Method for Preparing Battery

An example of the method for preparing the batteries of the first to seventh embodiments will now be described.

First, pastes used for printing and forming the first region 310, the second region 320, the positive electrode layer, and the negative electrode layer are prepared. The pastes for the first region 310 and the second region 320 may be prepared from the same solid electrolyte material or different solid electrolyte materials. A glass powder of a $Li_2S$—$P_2S$-based sulfide having an average particle diameter of about 10 μm and containing a triclinic crystal as a main component is prepared as the solid electrolyte material used as a mixture component for the first region 310, the second region 320, the positive electrode layer, and the negative electrode layer. A powder that has a high ion conductivity (for example, 2 to $3\times10^{-3}$ S/cm) when formed into a compact can be used as this powder. Solid electrolyte pastes prepared by adding an organic binder and a solvent to the glass powder and mixing and dispersing the resulting mixture are prepared as the pastes for forming the first region 310 and the second region 320. A powder of Li—Ni—Co—Al complex oxide ($LiNi_{0.8}Co_{0.15}Al_{0.05}O_2$) having an average particle diameter of about 5 μm and having a layered structure is used as the positive electrode active material. A positive electrode layer paste composed of a mixture containing this active material and the glass powder described above is prepared in the same manner. A powder of natural graphite having an average particle diameter of about 10 μm is used as the negative electrode active material. A negative electrode layer paste composed of a mixture containing this active material and the glass powder described above is prepared in the same manner.

Next, copper foils having a thickness of about 30 μm to be used as the positive electrode current collector and the negative electrode current collector are prepared. The positive electrode layer paste and the negative electrode layer paste are respectively screen-printed onto surfaces of the copper foils while respectively drawing predetermined patterns so that the thickness of the paste applied is about 50 to 100 pam. When dried at 80 to 130° C., the thickness decreases to 30 to 60 μm. In this manner, current collectors (copper foils) on which a printed body that serves as a positive electrode layer and a printed body that serves as a negative electrode layer are respectively formed are obtained.

Next, the solid electrolyte paste described above is printed by using a metal mask onto each of the surfaces of the current collectors on which the printed body that serves as a positive electrode layer and a printed and the printed body that serves as a negative electrode layer are respectively formed, so that the thickness of the paste printed is about 100 pam. Then the printed paste is dried at 80 to 130° C.

Next, these components are stacked so that the solid electrolyte layer on the positive electrode layer side and the solid electrolyte layer on the negative electrode layer side face each other, and placed in a die having a rectangular outer shape. Next, an elastic sheet (70 μm in thickness) having an elastic modulus of about $5\times10^{6}$ Pa is inserted between a pressure die punch and the stack. Then, a pressure of 300 M Pa is applied for 90 seconds while heating at 50° C. As a result, a multilayer body is obtained.

Those materials which have Young's moduli (longitudinal elastic moduli) that satisfy the relationship, "solid electrolyte material (20 GPa)<positive and negative electrode active materials (150 GPa)", can be used as the solid electrolyte material, the positive electrode active material, and the negative electrode active material. Here, the Young's modulus of a typical sulfide-based solid electrolyte is 10 to 30 GPa. The Young's modulus of metals and oxides is 100 to 300 GPa.

As the dried films prepared from the pastes for the solid electrolyte layer, the positive electrode layer, and the negative electrode layer, the dried films whose compaction rates between before and after pressurizing during stacking of the layers satisfy the relationship, "solid electrolyte (about 30%) >positive and negative electrode active materials (about 10%)" are used. The compaction properties of the printed bodies of the pastes can be controlled through the production process (for example, the design of the binder or the solvent, the drying method, etc.). Here, at a Young's modulus of the sulfide-based solid electrolyte, pressure deformation also occurs; thus, the compaction rate can be easily increased by using the sulfide-based solid electrolyte.

As described above, when raw materials that satisfy the relationships regarding the elastic properties or compaction properties are used and the raw materials are integrally pressurized by the above-described method, a multilayer body that satisfies the relationship, "second density (relative density: 90%)>first density (relative density: 82%)", can be obtained. Here, the relative density means the ratio relative to the theoretical density. In the case of the sulfide-based glass powder described above, the density (theoretical value) calculated from the unit cell of the crystal structure is 2.0 g/cm$^3$. Furthermore, the density and conductivity of the first region 310 are 1.64 g/cm$^3$ and $2.2\times10^{-3}$ S/cm, respectively. Furthermore, the density and conductivity of the second region 320 are 1.8 g/cm$^3$ and $2.5\times10^{-3}$ S/cm, respectively. The density inside the battery can be confirmed through sectional observation with a SEM, for example. The conductivity can be evaluated through a microproperty analyzer such as a microprobe.

The conductivity can be evaluated by preparing test samples having the same relative density. Here, the first region 310 is the battery operation portion. In other words, the first region 310 is an operation region in which an electric current flows as a result of transfer of ions during charge and discharge of the battery. Thus, the conductivity of the first region 310 is preferably as high as possible. In contrast, the second region 320 (and the third region 330) is the region that has relatively little involvement in the transfer of ions. Thus, the relationship, "conductivity of first region 310<conductivity of second region 320" may be satisfied. In this case, the effective thermal conductivity changes in similar manner according to the density or conductivity by the increase in effective area and the increase in conductive carriers, which also function as thermal conduction carriers. Thus, the relationships regarding the density and the conductivity are reflected to the thermal conductivity. Thus, when the relationship, "conductivity of first region 310<conductivity of second region 320" is satisfied, the same relationship is satisfied for the thermal conductivity also. Note that the effective conductivity and the thermal conductivity improve as the density increases (typically, the strength also increases). In particular, the sulfide-based solid electrolyte has a higher elastic modulus and pressure sinterability than typical inorganic materials.

Thus, the density, conductivity, and strength can be improved over a wide range by increasing the packing rate (in other words, the density) by applying heat and/or pressure even when a powder compact is used.

When the first region 310 is to be formed by using a compact, the relative density may be controlled to a value equal to or higher than the percolation threshold at which the conductivity increases steeply relative to the relative density. In other words, the first density may be equal to or higher than the percolation threshold. In this manner, an appropriate conductivity can be obtained according to the powder. At the percolation threshold or higher, the conductivity relative to the increase in density improves gently. Thus, in order to operate the battery and satisfy the density relationships in the solid electrolyte layer 300, the relative density equal to or higher than the percolation threshold is suitable. In the case of the sulfide-based glass powder described above, the percolation threshold determined from the dependency of density and conductivity on pressure is at a relative density of about 70%. Meanwhile, the first region 310 and the second region 320 are formed to have relative densities of 82% and 90%, respectively.

When the compacts in the positive electrode layer, the negative electrode layer, and the solid electrolyte layer are pressurized, the compaction rate of the solid electrolyte layer may be larger than the compaction rate of the positive electrode layer and the compaction rate of the negative electrode layer. As clear from the Young's modulus and the compaction properties, the positive electrode layer and the negative electrode layer are hard and sparingly compactable layers. In contrast, the second region 320 is soft and easily compactable. Thus, when an elastic body inserted between the die and the multilayer body is compacted while being deformed by pressurizing, compaction proceeds selectively in the second region 320 rather than in the positive electrode layer or the negative electrode layer. In contrast, in the first region 310, since the positive electrode layer and the negative electrode layer are present under and above along the pressure application axis, the pressure is absorbed and lost. Thus, an attenuated pressure is transferred to the second region 320. Thus, the second region 320 inevitably exhibits a lower density than the first region 310. Thus, the relationship, "second density>first density", is satisfied.

In the production method described above, the difference between the first density and the second density can be increased by setting the difference in the Young's modulus or the compaction rate of the constituent materials to be larger or by decreasing the hardness (or increasing the thickness) of the elastic sheet, for example. Here, as illustrated in FIG. 16, a structure in which the thickness of the first region 310 is smaller than the thickness of the second region 320 can be obtained.

By shifting the range in which the positive electrode layer is formed from the range in which the negative electrode layer is formed, three regions with different compaction properties can be formed in the pressure axis direction. As a result, a battery having the third region 330 can be prepared by the above-described production method.

Note that the density relationship among the regions in the solid electrolyte layer can be realized by the following production methods as well as by one example of the production method described above.

That is, a paste (for example, a paste with a high solid content) having a higher solid electrolyte material content than the paste for forming the first region 310 can be prepared as the paste for forming the second region 320 (or the third region 330). Here, the density of each paste can be adjusted by adjusting the amounts of the solid electrolyte material and other materials (for example, a binder) contained in the paste. These pastes with different densities may be respectively applied to the surfaces of the current collectors by printing. Subsequently, the resulting paste layers may be pressurized by a typical parallel plate rigid body to form a multilayer body (battery).

Alternatively, after the pastes are printed and dried, the second region 320 (or the third region 330) may be selectively pressurized more strongly than the first region 310. For example, a laminating press method that uses a die with recesses and protrusions may be used.

Alternatively, after a high-density green sheet for the second region 320 (or the third region 330) is formed by application, the portion that will form the first region 310 may be punched out by a punching process. Subsequently, the paste for forming the first region 310 may be charged (or printed) into the recessed part formed thereby.

In the production methods described above, the batteries indicated in the first to seventh embodiments described above can be prepared by adjusting the positions where the first region 310, the second region 320, and the third region 330 are formed.

The battery according to the present disclosure can be used as the battery (for example, an all-solid secondary battery) used in various electronic devices, vehicles, etc.

What is claimed is:

1. A battery, comprising:

an electrode layer;

a counter electrode layer, which is a counter electrode for the electrode layer;

a solid electrolyte layer between the electrode layer and the counter electrode layer, an electrode current collector electrically coupled to the electrode layer; and a counter electrode current collector electrically coupled to the counter electrode layer, wherein:

the solid electrolyte layer includes a first region containing a first solid electrolyte material and a second region containing a second solid electrolyte material, the first region is positioned within a region where the electrode layer and the counter electrode layer face each other, with respect to the first region, the second region is positioned on an outer peripheral side of the region where the electrode layer and the counter electrode layer face each other, and the second region is in contact with the first region, a second density is higher than a first density, where the first density is of the first solid electrolyte material in the first region and the second density is of the second solid electrolyte material in the second region, and the second region is interposed between the electrode current collector and the counter electrode current collector and is in contact with the electrode current collector and the counter electrode current collector.

2. The battery according to claim 1, wherein the second region surrounds the first region.

3. The battery according to claim 1, wherein:

the first region includes a first projecting portion that projects outward from a region where the electrode layer and the counter electrode layer face each other, and the second region covers the first projecting portion.

4. The battery according to claim 1, wherein the second region is in contact with an end portion of the electrode layer.

5. The battery according to claim 4, wherein the second region surrounds the electrode layer.

6. The battery according to claim 4, wherein the second region is in contact with an end portion of the counter electrode layer.

7. The battery according to claim 6, wherein the second region surrounds the counter electrode layer.

8. The battery according to claim 1, wherein, when a distance between the electrode current collector and the counter electrode current collector at a position in which the first region lies is assumed to be a first distance, and when a distance between the electrode current collector and the counter electrode current collector at a position in which the second region lies is assumed to be a second distance, a second distance is smaller than a first distance.

9. The battery according to claim 1, wherein the first solid electrolyte material and the second solid electrolyte material are a same material.

10. The battery according to claim 1, wherein:

the solid electrolyte layer includes a third region containing a third solid electrolyte material, the third region is in contact with the second region, the second region is positioned between the first region and the third region, and a third density is higher than the second density, where the third density is of the third solid electrolyte material in the third region.

11. The battery according to claim 10, wherein:

the electrode layer contains an electrode active material, the counter electrode layer contains a counter electrode active material, a fourth density of the electrode active material and a fifth density of the counter electrode active material in the first region are both lower than the first density, a sixth density of the electrode active material and a seventh density of the counter electrode active material in the second region are both lower than the second density, and an eighth density of the electrode active material and a ninth density of the counter electrode active material in the third region are both lower than the third density.

12. The battery according to claim 11, wherein the first region, the second region, and the third region do not contain the electrode active material or the counter electrode active material.

13. The battery according to claim 10, wherein the third region surrounds the second region.

14. The battery according to claim 10, wherein:

the second region includes a second projecting portion that projects outward from a region where the electrode layer and the counter electrode layer face each other, and the third region covers the second projecting portion.

15. The battery according to claim 10, wherein:

a range in which the counter electrode layer is formed is larger than a range in which the electrode layer is formed, the electrode layer is positioned within the range in which the counter electrode layer is formed, the second region is in contact with an end portion of the electrode layer, and the third region is in contact with an end portion of the counter electrode layer.

16. The battery according to claim 15, wherein:

the second region surrounds the electrode layer, and the third region surrounds the counter electrode layer.

17. The battery according to claim 10, further comprising:

an electrode current collector electrically coupled to the electrode layer; and a counter electrode current collector electrically coupled to the counter electrode layer, wherein the third region is interposed between the electrode current collector and the counter electrode current collector and is in contact with the electrode current collector and the counter electrode current collector.

18. The battery according to claim 17, wherein:

a second distance is smaller than a first distance, and a third distance is smaller than the second distance, where the first distance is between the electrode current collector and the counter electrode current collector at a position in which the first region lies, the second distance between the electrode current collector and the counter electrode current collector at a position in which the second region lies, and the third distance is between the electrode current collector and the counter electrode current collector at a position in which the third region lies.

19. The battery according to claim 10, wherein the first solid electrolyte material, the second solid electrolyte material, and the third solid electrolyte material are a same material.

* * * * *